Dec. 14, 1926.
R. E. BAKER ET AL
1,610,729
CONVEYING MECHANISM
Filed April 8, 1921    15 Sheets-Sheet 1
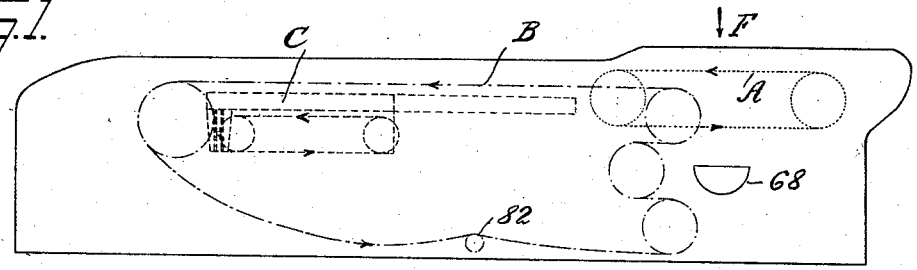
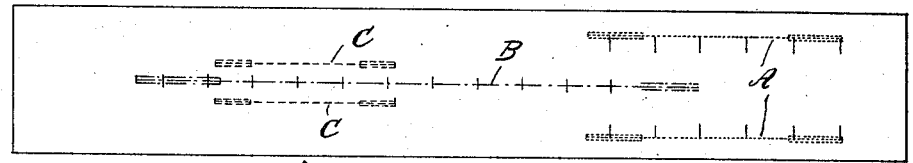
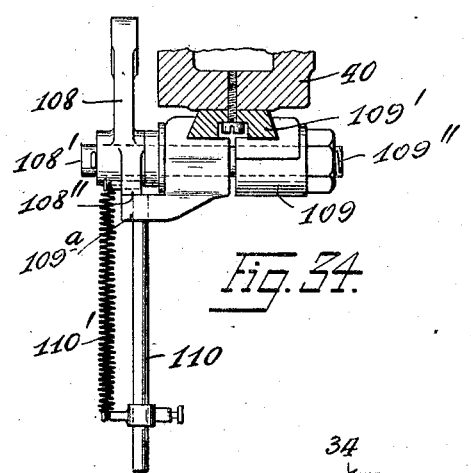
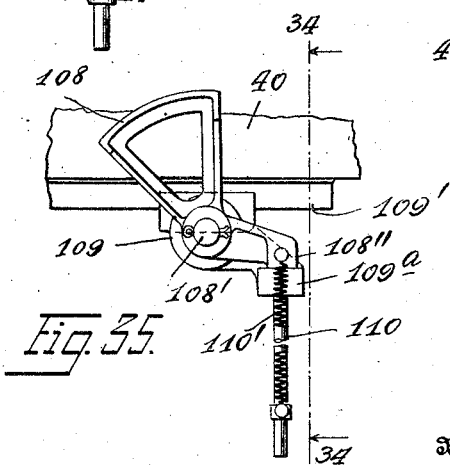
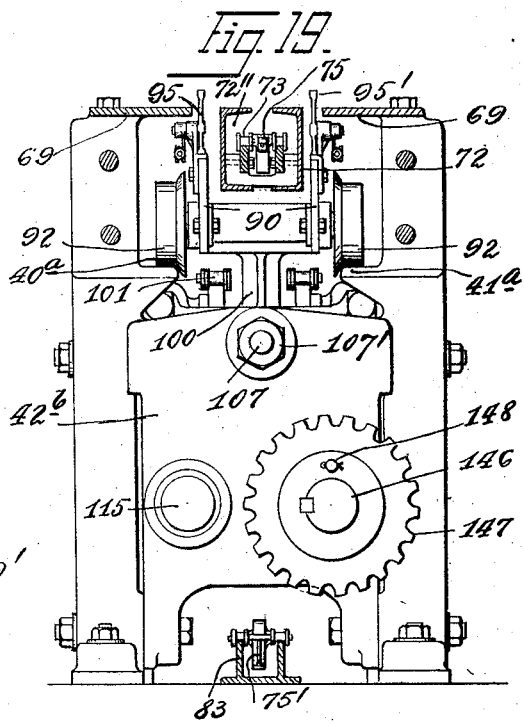
Inventors
Robert Elmer BAKER
Laurence Seymour HARBER
By their Attorney
John Lotka

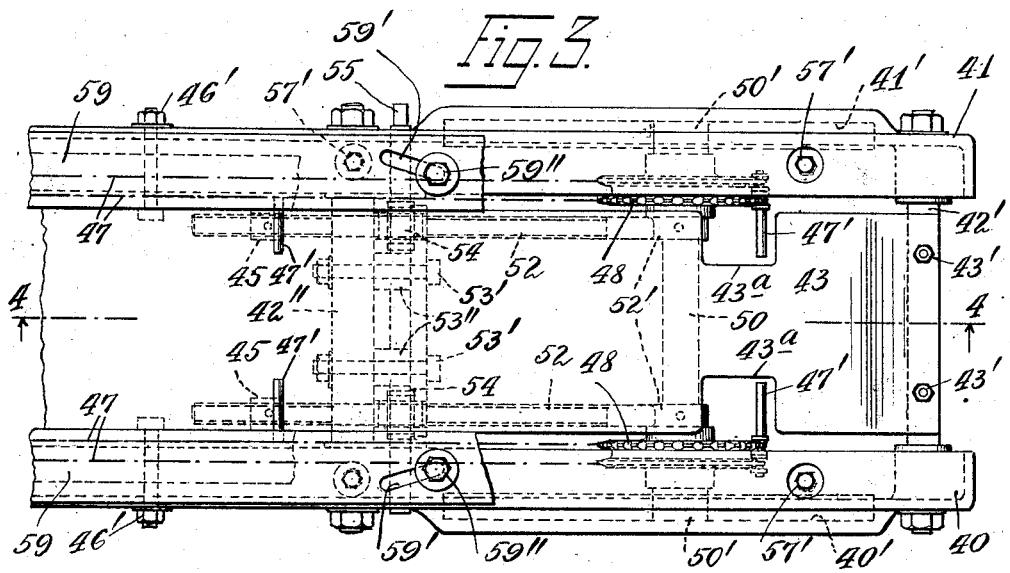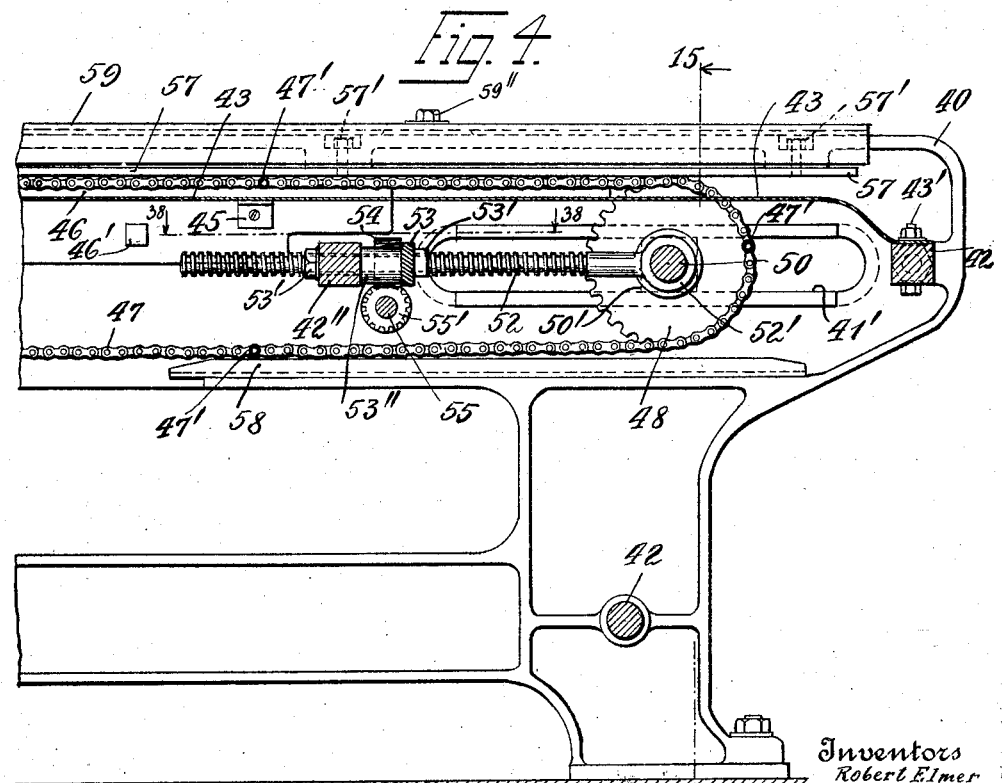

Dec. 14, 1926.  1,610,729
R. E. BAKER ET AL
CONVEYING MECHANISM
Filed April 8, 1921     15 Sheets-Sheet 3
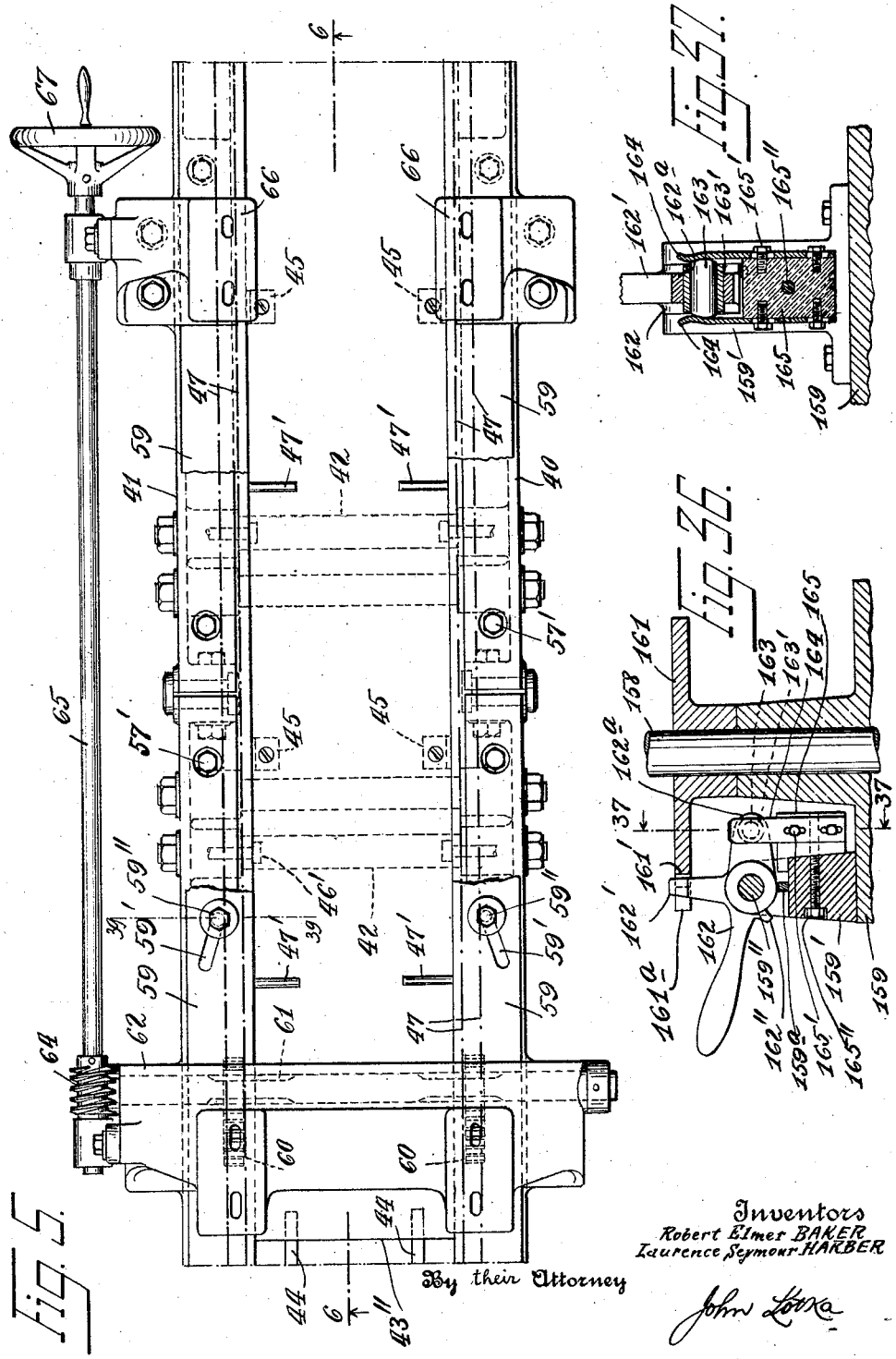
Inventors
Robert Elmer BAKER
Laurence Seymour HARBER
By their Attorney
John Lotka Dec. 14, 1926. 1,610,729
R. E. BAKER ET AL
CONVEYING MECHANISM
Filed April 8, 1921   15 Sheets-Sheet 4
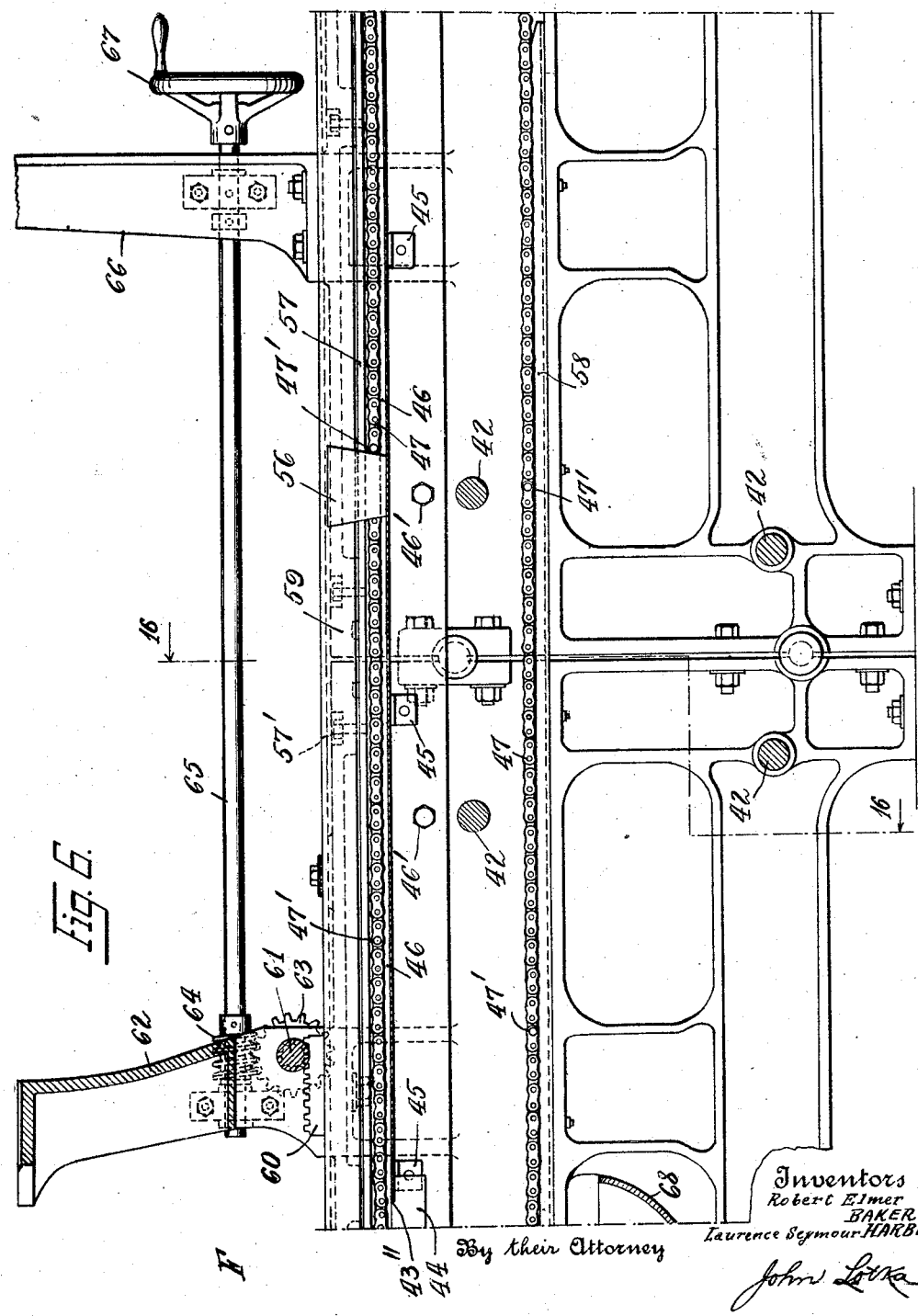

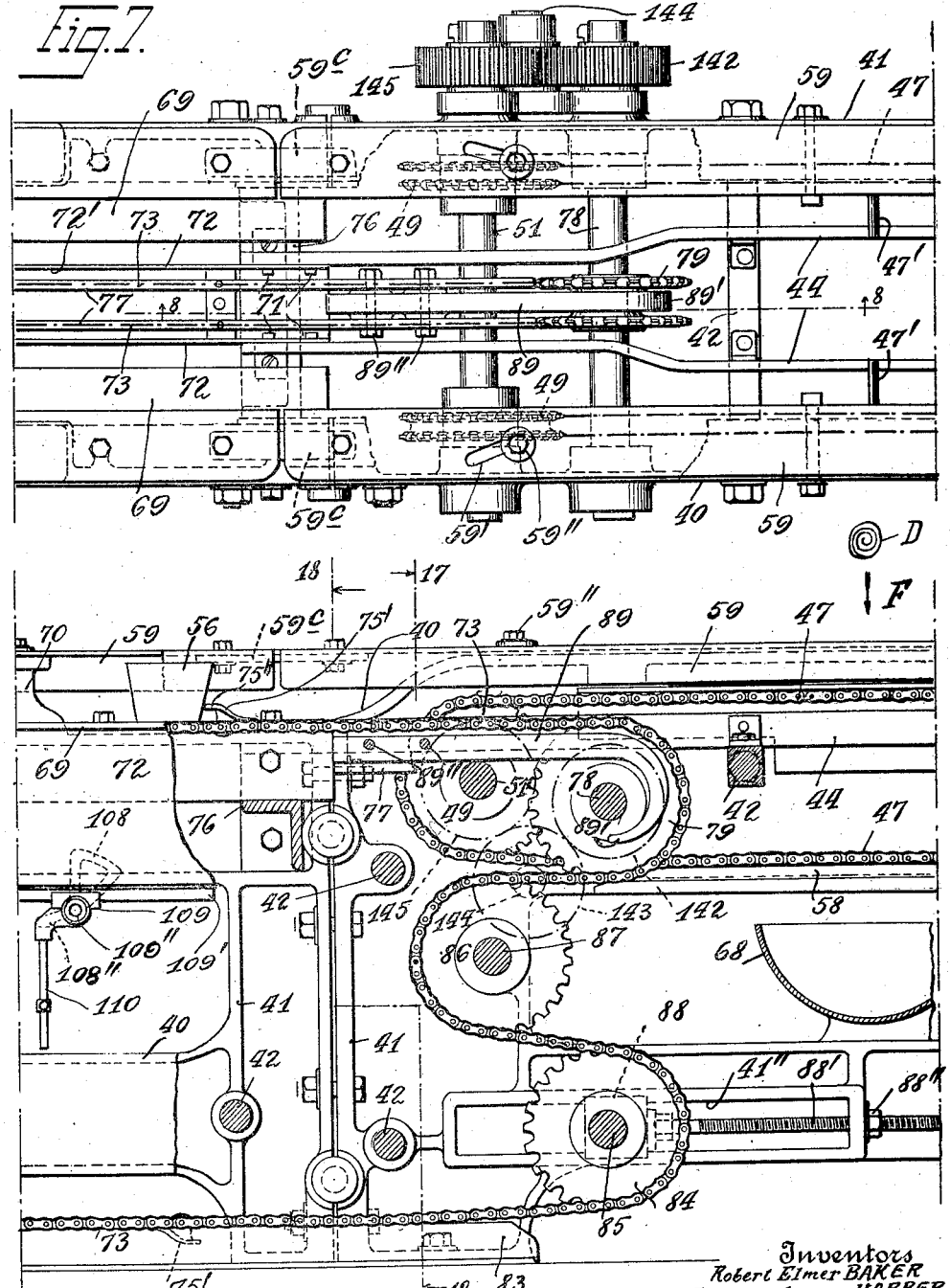

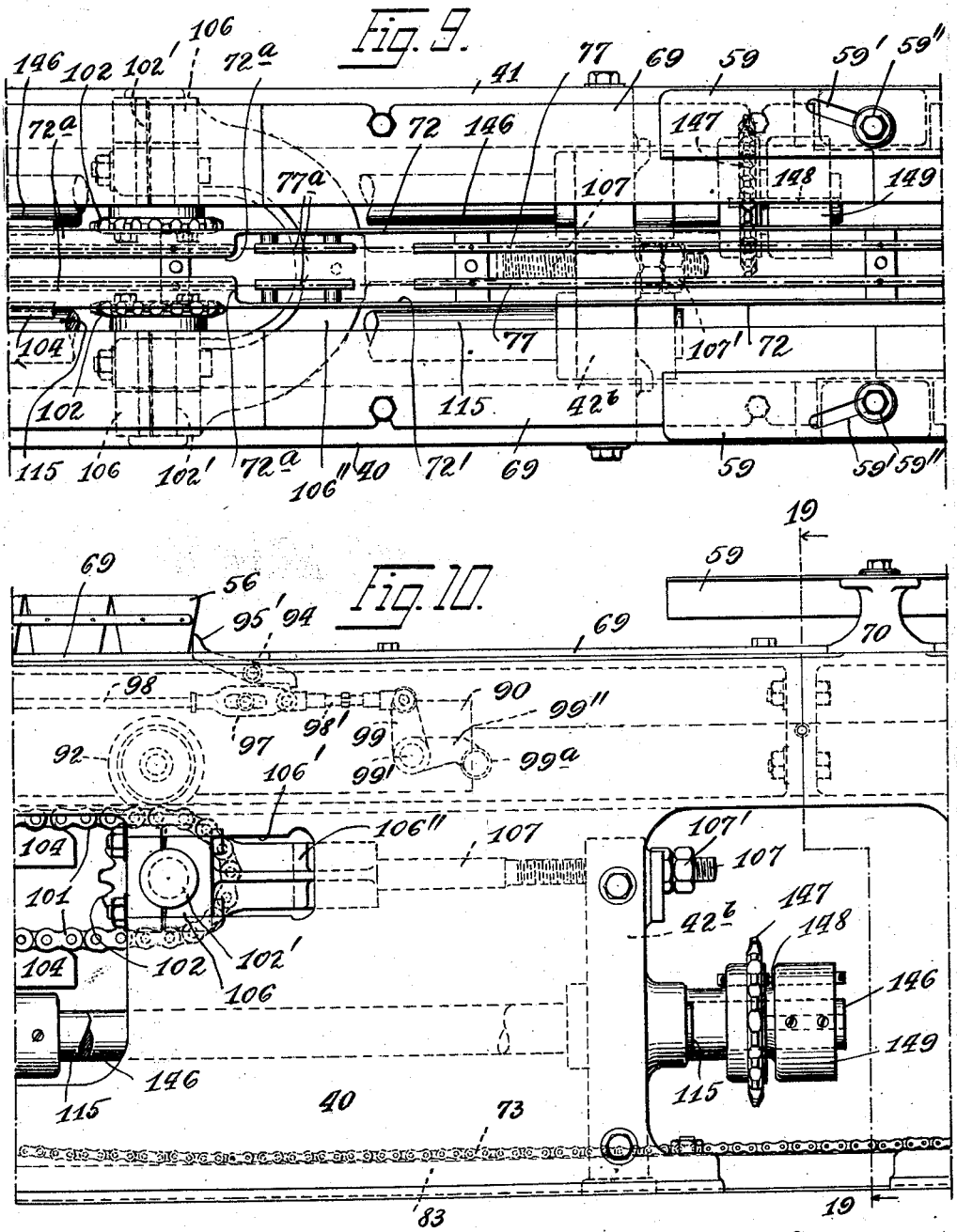

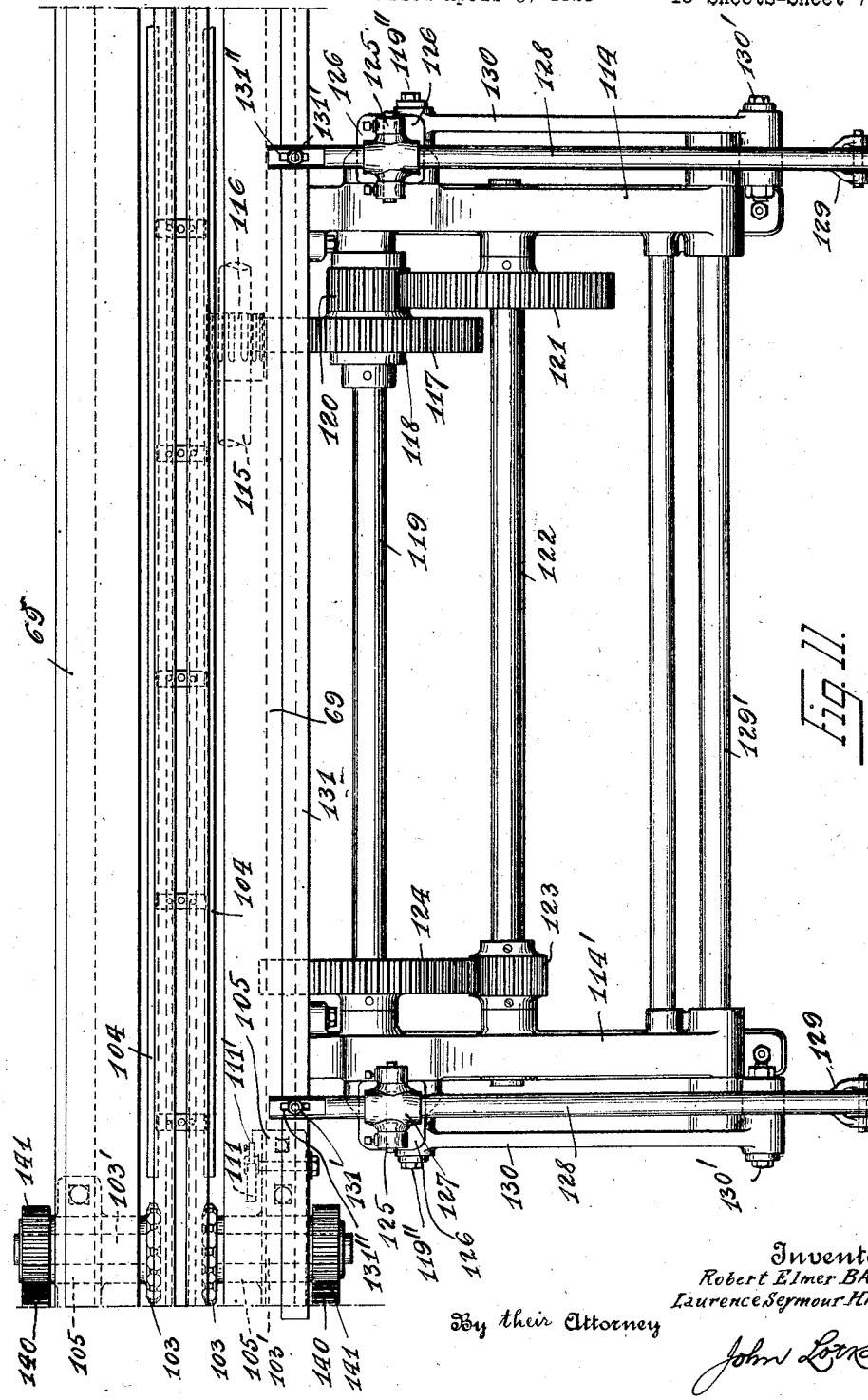

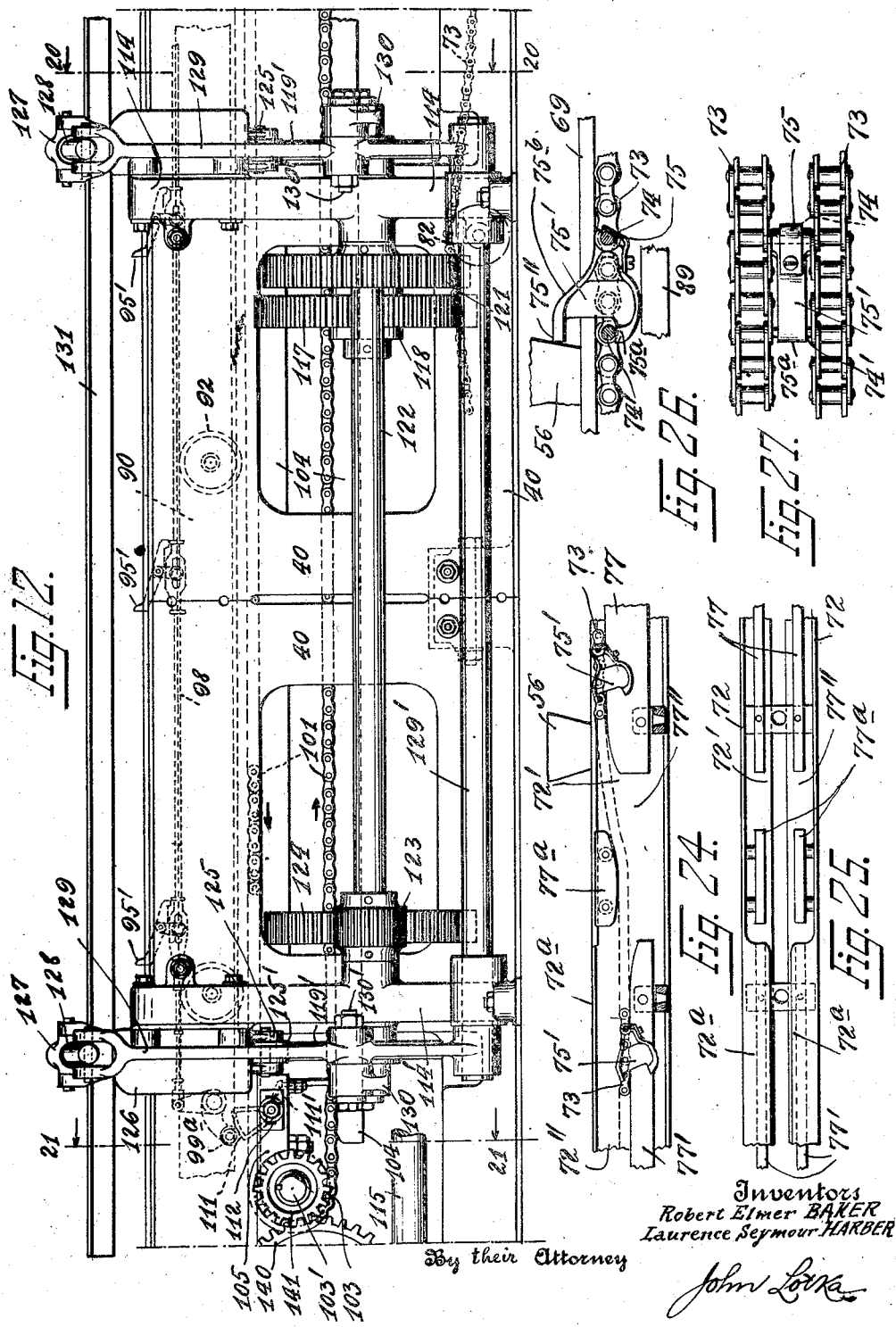

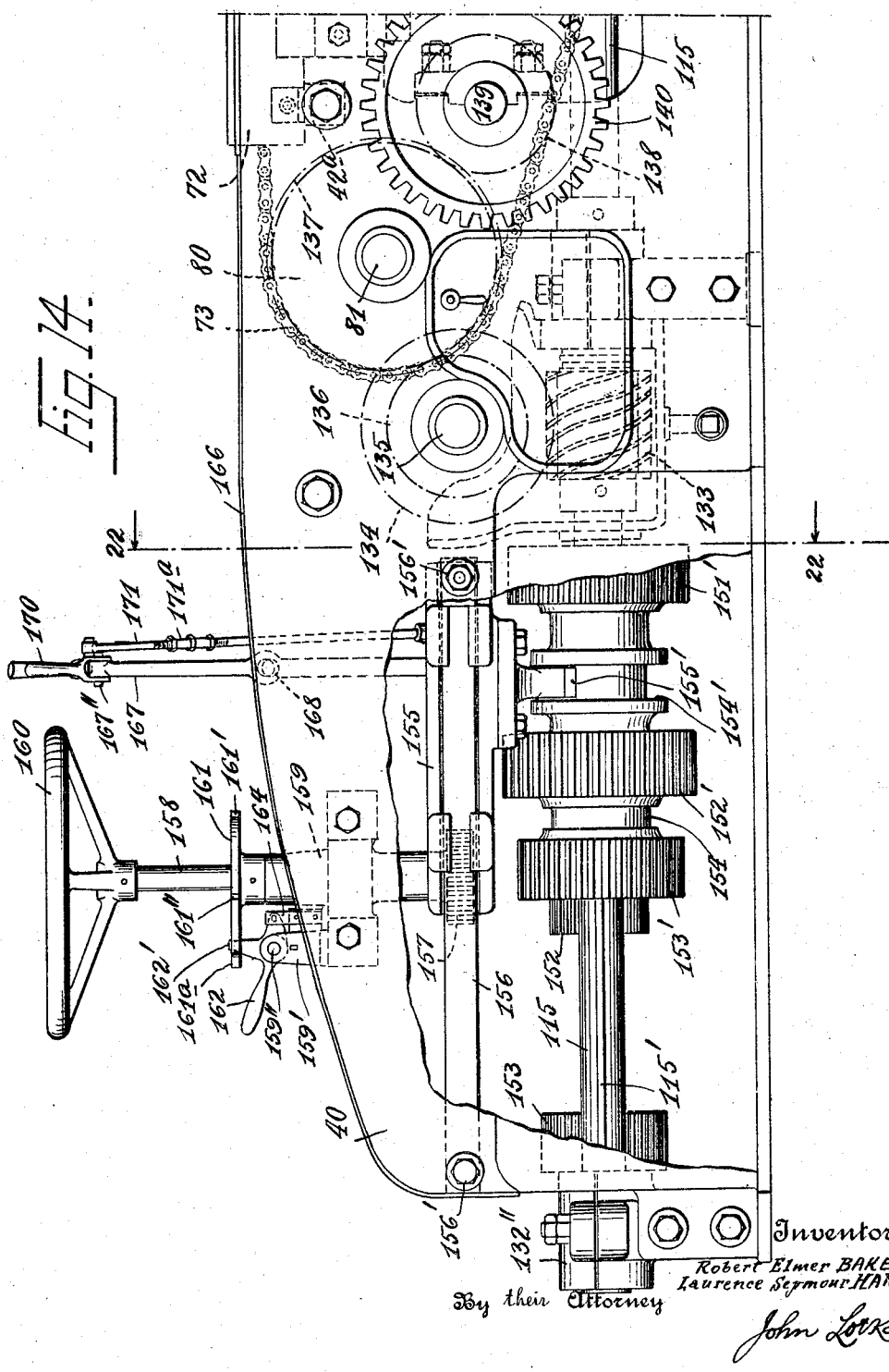

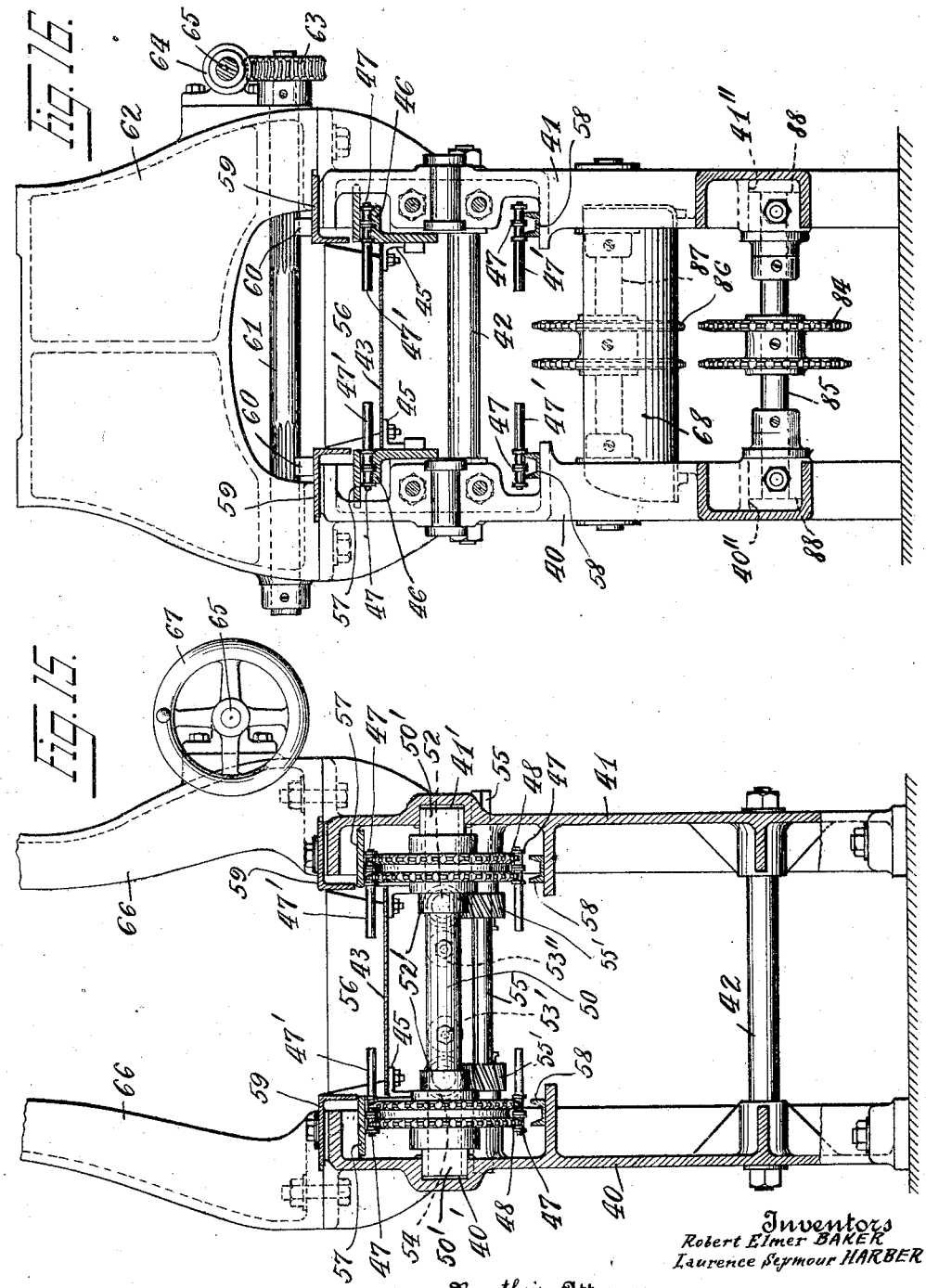

Dec. 14, 1926.
R. E. BAKER ET AL
1,610,729
CONVEYING MECHANISM
Filed April 8, 1921   15 Sheets-Sheet 11
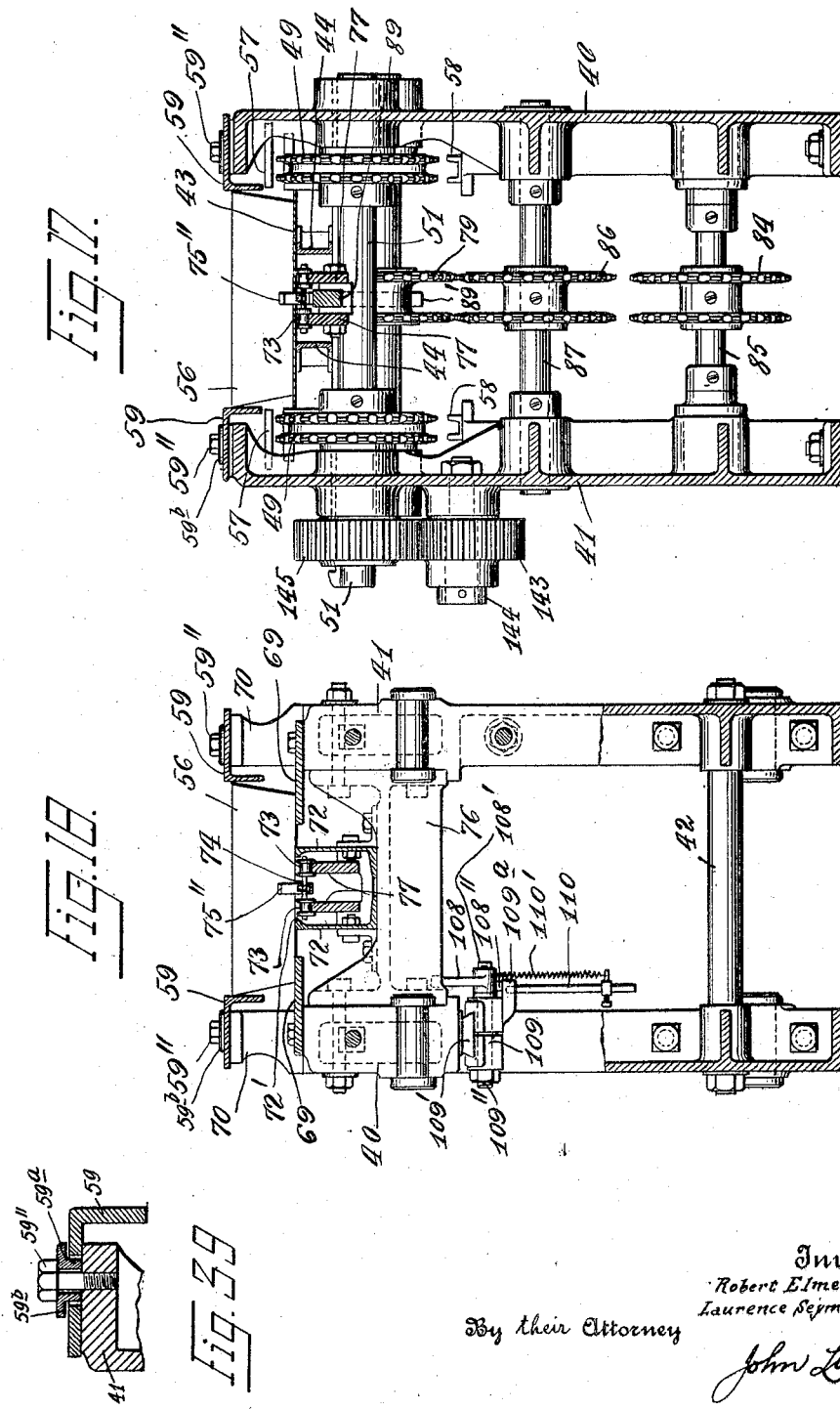
Inventors
Robert Elmer BAKER
Laurence Seymour HARBER
By their Attorney
John Lotka Dec. 14, 1926.
R. E. BAKER ET AL
1,610,729
CONVEYING MECHANISM
Filed April 8, 1921
15 Sheets-Sheet 12
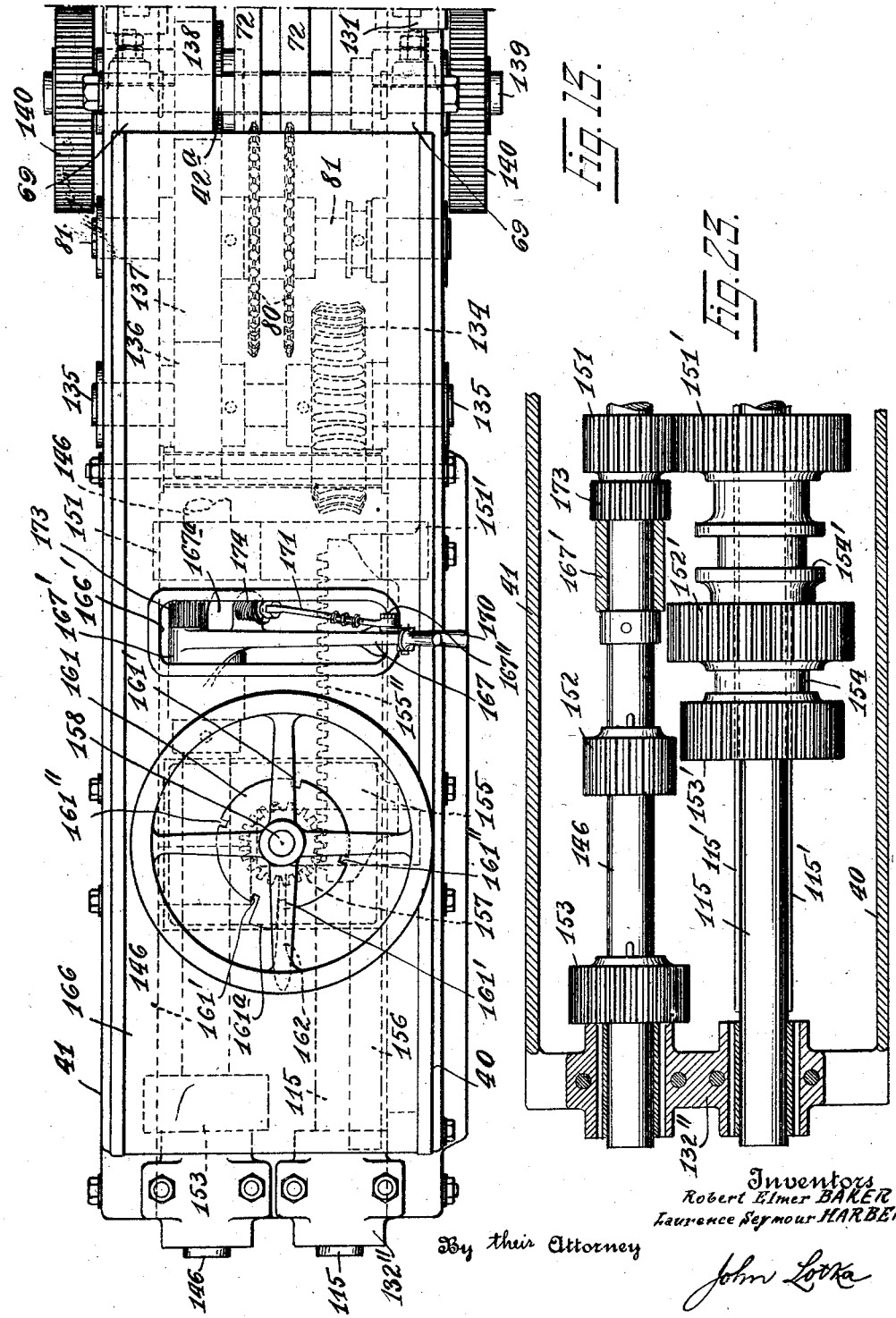
Inventors
Robert Elmer BAKER
Laurence Seymour HARBER
By their Attorney
John Lovka

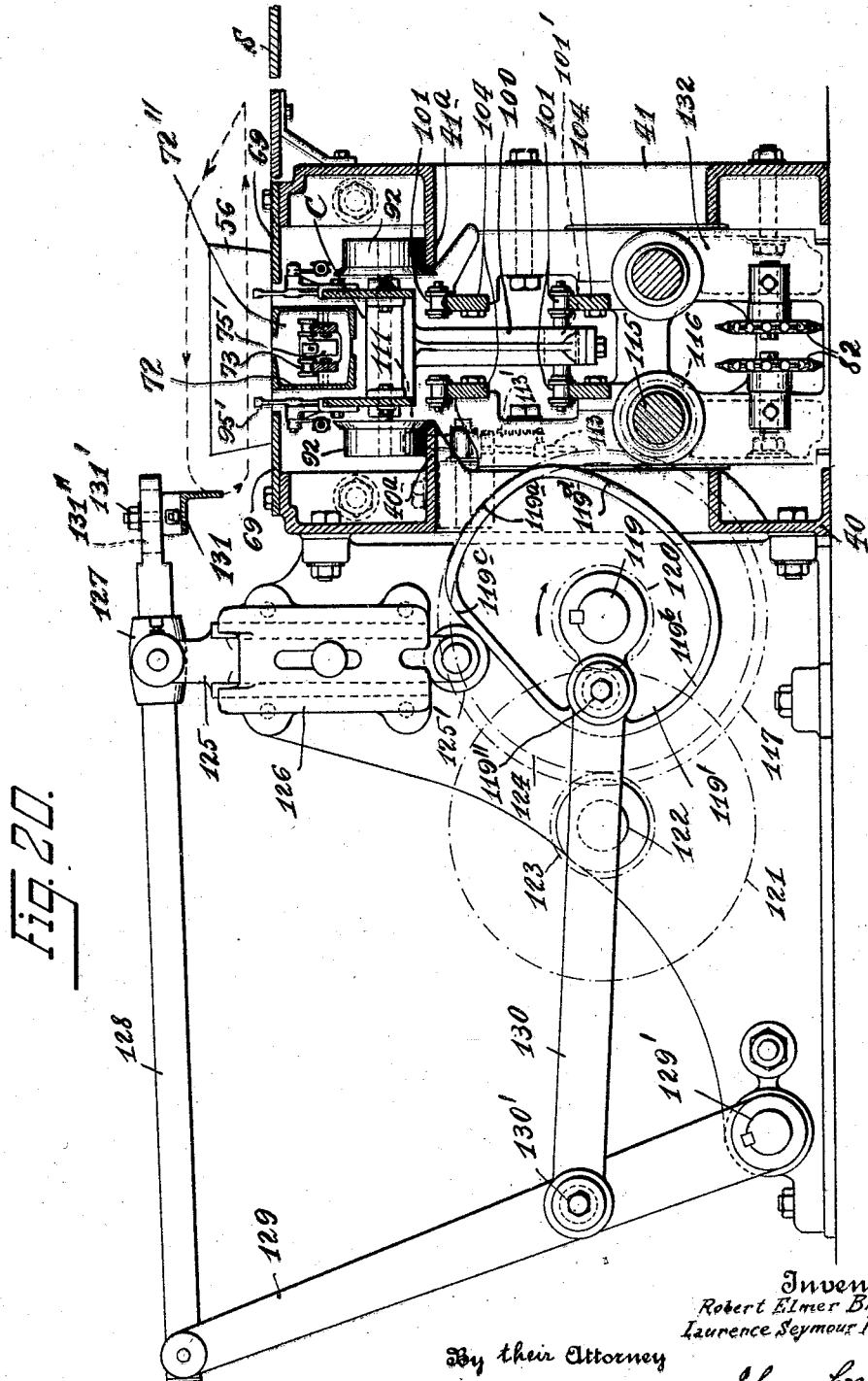

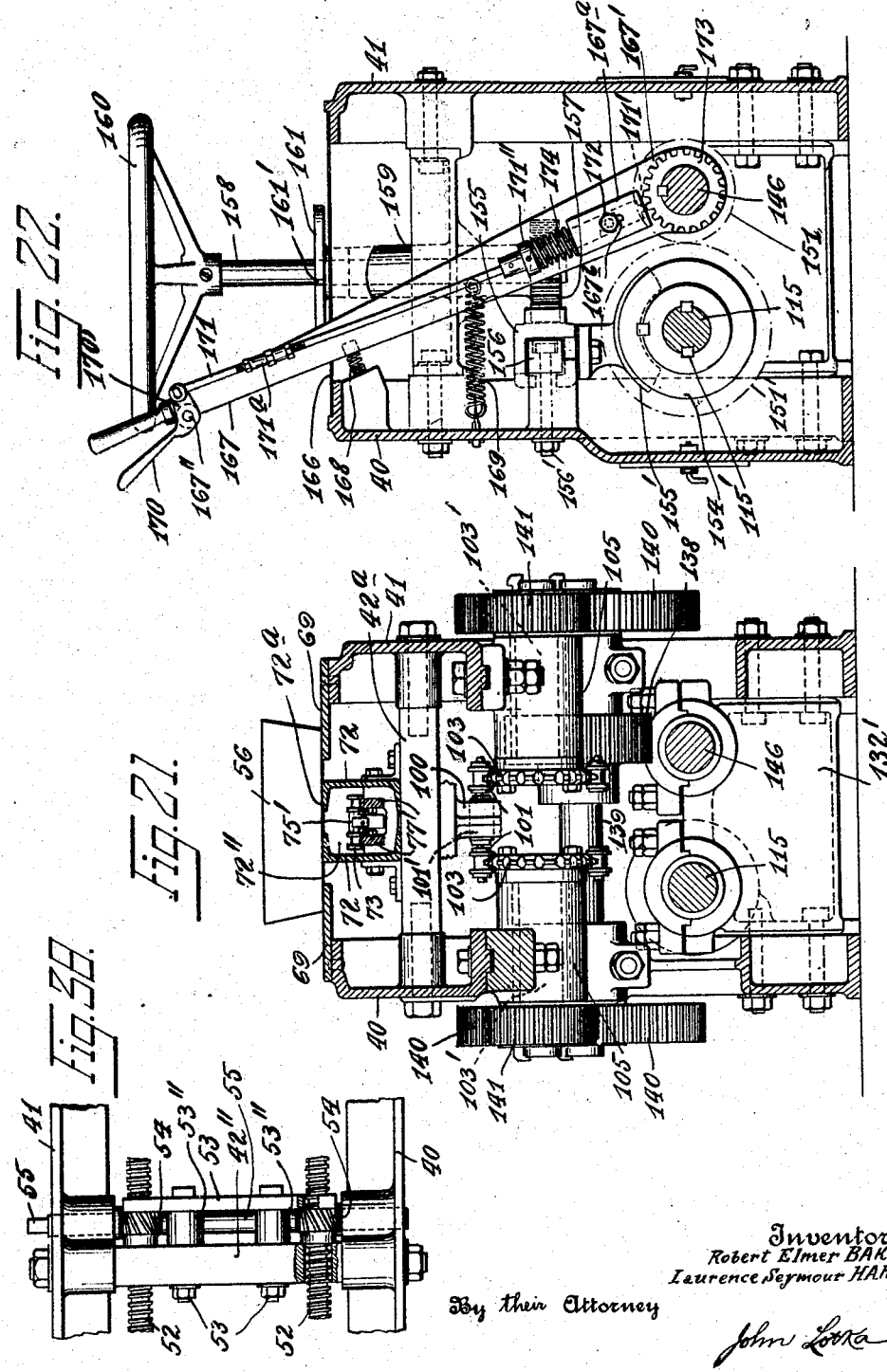

Dec. 14, 1926.
R. E. BAKER ET AL
1,610,729
CONVEYING MECHANISM
Filed April 8, 1921   15 Sheets-Sheet 15
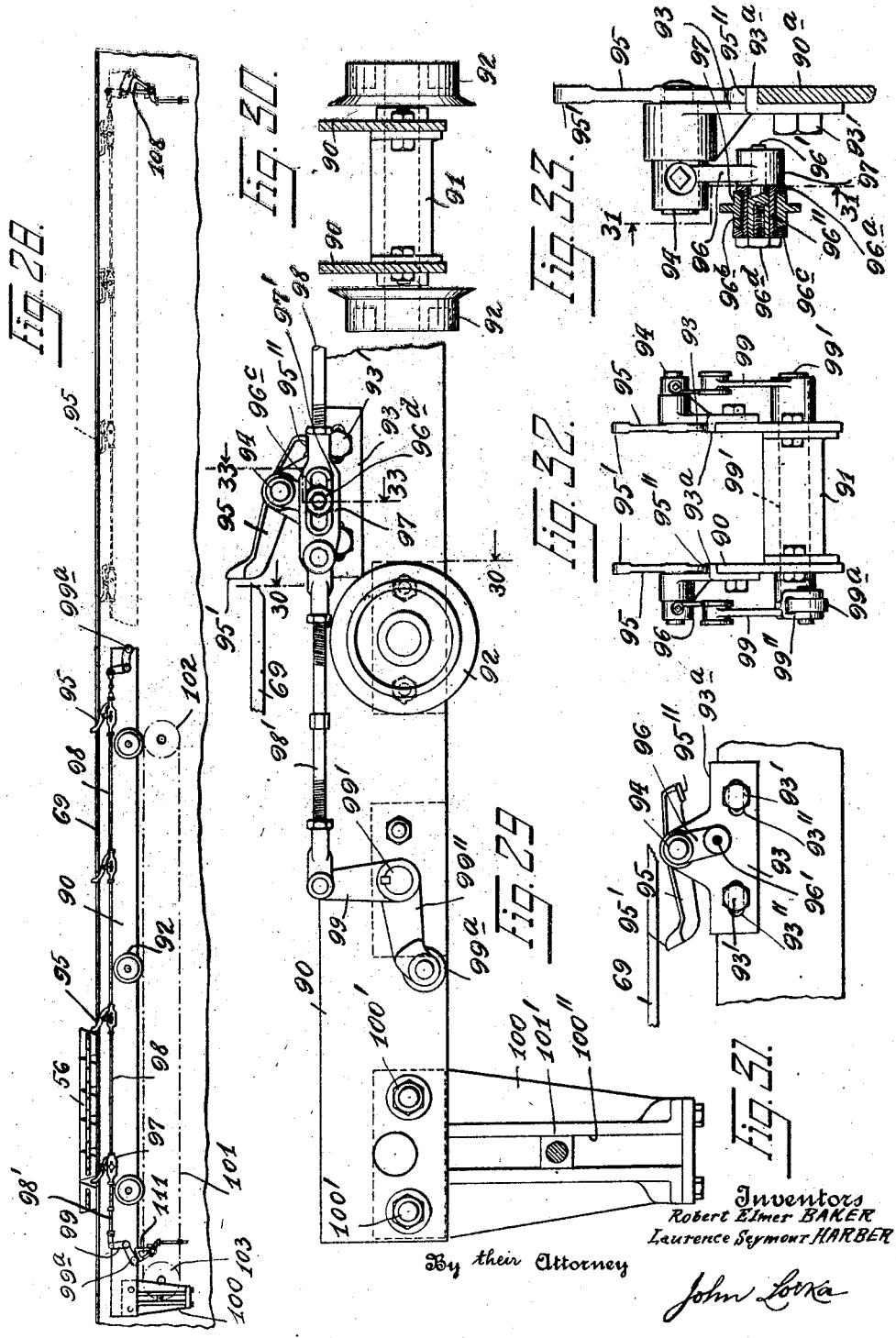
Inventors
Robert Elmer BAKER
Laurence Seymour HARBER
By their Attorney
John Lorka Patented Dec. 14, 1926.

1,610,729

UNITED STATES PATENT OFFICE.

ROBERT ELMER BAKER, OF BRONXVILLE, AND LAURENCE SEYMOUR HARBER, OF KATONAH, NEW YORK, ASSIGNORS TO JOSEPH BAKER SONS & PERKINS COMPANY, INC., OF WHITE PLAINS, NEW YORK, A CORPORATION OF NEW YORK.

CONVEYING MECHANISM.

Application filed April 8, 1921. Serial No. 459,680.

This invention relates to conveyer mechanisms designed especially for use in large bakeries for the purpose of transporting lumps or rolls of dough from a conveyer which has received them from a machine in which they are moulded, that is, rolled into substantially cylindrical shape, to another machine forming part of the baking plant, the so-called "final proofer". The mechanism is however applicable in other relations as well, and the scope of the invention is indicated in the appended claims.

In the machine illustrated, the tins or pans which are to receive the moulded lumps of dough, are first taken along by a conveyer, and while moving with this conveyer, they are charged from above with such lumps of dough; this first conveyer engages the pans at both sides, while another conveyor which in its action follows the first conveyer and travels at the same speed, engages the pans in the center, from below, and feeds them along the pan-supporting table. Then a third conveyer, in the form of a reciprocating carriage, which travels at substantially twice the speed of the first two conveyers, takes several sets of pans away from the second conveyer and feeds them along to a position from which they are subsequently removed sideways by a reciprocating pusher which transfers a unit of pans consisting of the several sets onto a conveyer or other support arranged in the final proofer. Means are also provided for effecting an adjustment of the speed of conveyers and pusher, so as to accommodate pans of different sizes. The invention also comprises various other adjustments which will be fully described hereinafter.

In the accompanying drawings, in which the same reference numerals and letters have been used to designate the same machine parts, we have illustrated a preferred embodiment of our present invention. In these drawings, Figs. 1 and 2 are views illustrating diagrammatically the general arrangement of our conveyer mechanism, Fig. 2 being a top view and Fig. 1 a side elevation; Fig. 3 is a top view of the right-hand or receiving end of our machine, with parts broken away; Fig. 4 is a longitudinal section taken on line 4—4 of Fig. 3; Figs. 5, 7, 9, 11 and 13 are top views of successive portions of the machine, following after Fig. 3, from right to left; Figs. 6 and 8 are longitudinal sections taken on lines 6—6 and 8—8 of Figs. 5 and 7 respectively; Figs. 10, 12 and 14 are side elevations corresponding to Figs. 9, 11 and 13 respectively; Figs. 15, 16, 17, 18, 19, 20, 21 and 22 are transverse cross sections taken on lines 15—15 of Fig. 4, 16—16 of Fig. 6, 17—17 of Fig. 8, 18—18 of Fig. 8, 19—19 of Fig. 10, 20—20 and 21—21 of Fig. 12, and 22—22 of Fig. 14 respectively; Fig. 23 is a partial horizontal section showing certain gearing indicated in Figs. 13 and 14; Figs. 24, 25, 26, and 27 are detail views illustrating parts of one of the conveyer mechanisms and the tracks therefor, Figs. 24 and 26 being side elevations, Fig. 25 a top view of Fig. 24 with parts omitted, and Fig. 27 a bottom view of Fig. 26; Figs. 28, 29, 30, 31, 32 and 33 are detail views of the carriage forming one of the conveyer mechanisms, Fig. 28 being a side elevation showing two different positions of the carriage, Fig. 29 an enlarged view of the left-hand end of the carriage, Figs. 30 and 33 sections on lines 30—30 and (in part) 33—33 of Fig. 29, Fig. 31 a section on line 31—31 of Fig. 33, and Fig. 32 an end view of the right-hand end of the carriage; Figs. 34, 35 are detail views of certain cam mechanism employed in connection with the carriage, Fig. 34 being an end or edge view of such cam, with parts in section on line 34—34 of Fig. 35, the latter being a side elevation looking from the inside of the machine; Fig. 36 is a detail view of a locking lever used in connection with the gearing shown in Fig. 23; Fig. 37 is a section on line 37—37 of Fig. 36; Fig. 38 is a partial horizontal section taken on line 38—38 of Fig. 4 and illustrating clearly certain details shown in plan view in Fig. 3; and Fig. 39 is a section taken on line 39—39 of Fig. 5.

Our conveying mechanism comprises parallel frames 40, 41 suitably spaced from each other by spacing rods 42, 42′, 42″. The rod 42′ at the receiving end of the machine (shown at the right in Figs. 3 and 4), is preferably made of rectangular cross section, and to its flat upper surface is secured, as by screws 43′, one end of a table 43 extending lengthwise of the machine, between the frames 40, 41, the other end of this table, which is indicated by the numeral 43″ (Figs. 5 and 6), resting on spaced bridging bars 44 forming a continuation of the table 43 and flush with its upper surface. Between its ends, the table is supported by brackets 45 secured to the depending flanges of chain tracks 46 extending lengthwise of the machine adjacent the frames 40, 41 and secured thereto rigidly, as by screws 46′ (Figs. 4, 6 and 16). The upper surface of each of the tracks 46 is grooved, as shown best in Fig. 16, for the reception of a double conveyer chain 47 engaged with double sprocket wheels 48, 49 secured rigidly to shafts 50, 51 respectively, carried by the frames 40, 41. The conveyer formed by the chains 47 has been indicated in its entirety by the letter A, see Figs. 1 and 2 while the bearings of shaft 51 are stationary with respect to the frames 40, 41, the bearings of shaft 50 are mounted adjustably, that is, they are capable of a movement lengthwise of the frames, for the purpose of always keeping the chains 47 under proper tension. To this effect, we provide, adjacent to the sprockets, screw-threaded rods 52 having perforated heads 52′ through which the shaft 50 extends loosely. The said shaft is journaled in bearing 50′ having ends of preferably rectangular cross section supported and adapted to slide in guide slots 40′, 41′ provided in the frames 40, 41 and extending lengthwise thereof. The rods 52 extend loosely through a frame-spacing bar 42″ and also loosely through another bar, 53, secured rigidly to the bar 42″ by means of screws 53′, but spaced therefrom by means of sleeves 53″ (Figs. 3, 4 and 38). Between these two bars are provided two worm-wheels 54 having internal screw threads in engagement with the threads of the rods 52, and these worm-wheels are in engagement with worms 55′ on a tranverse shaft 55 having a preferably square end projecting to the outside of one of the frames, say 41, for convenient engagement with a crank or the like by means of which the shaft 55 can be rotated. Such rotation of the shaft 55 will cause the worm-wheels 54 to turn, thus giving the screw-threaded rods 52 and thereby the sprockets 48, a movement lengthwise of the machine.

At regular intervals, the conveyer chains 47 are provided with inwardly projecting, transversely aligning pins 47′ (Figs. 3, 4, 15 and 16) adapted to engage tins or pans 56 placed on the table 43. In order to allow the pins to come up from below the table at the right-hand or receiving end of the machine, the table is suitably cut out on both sides, adjacent to the sprockets 48, as shown at 43ª (Fig. 3). To hold the chains 47 securely in the tracks 46 and thus insure proper engagement of the pins 47′ with the tins or pans 56, a cover plate 57 is provided above the upper run of each of the chains; these cover plates are secured rigidly to the frames 40, 41, as by screws 57′, and they extend practically the whole length of the upper chain run. The lower or return run of the chains 47 is supported on tracks 58 carried by a suitable ledge on the frames 40, 41 (Figs. 4, 15 and 16).

On their upper surfaces, the frames 40, 41 carry plates 59 having on the inner sides of the frames downwardly-extending flanges forming guides for the tins or pans supported on the table 43. The guide plates are capable of an in-and-out movement, that is to say, they are so mounted that the space between the opposing flanges can be made wider or narrower, to accommodate pans of greater or lesser width. This is accomplished by a movement of the plates lengthwise of the machine, and the plates are provided with oblique slots 59′ (Figs. 3 and 5) through which extend screws 59″. Each screw 59″ is surrounded by a collar 59ª resting on the frames 40, 41 and having a flange 59ᵇ engaged by the head of the screw, as shown in Fig. 39. The plates 59 have a sliding fit between said flanges 59ᵇ and the adjacent surfaces of the frames 40, 41. In order to effect the longitudinal movement of the plates 59, they are provided at their upper surfaces with racks 60 in mesh with teeth formed in the surface of a tranverse shaft 61 supported above the frames 40, 41 in an upright or standard 62 extending from the frames 40, 41. At one of its ends, the shaft 61 has a worm-wheel 63 (Fig. 6) in mesh with a worm 64 on a shaft 65 supported in bearings on the standard 62 and on one of two standards 66 carried by the frames 40, 41, the shaft 65 being provided at one end with a hand wheel 67. It will be seen that by turning the hand wheel 67 the toothed shaft 61 will be rotated, and thereby the plates 59 will be moved lengthwise of the machine. Owing to the engagement of the oblique slots 59′ with the collars 59ª, these plates will at the same time be brought nearer to the center plane of the machine, or farther away as the case may be. In order to reduce friction during the adjustment just described, the plates 59 do not rest on the frames 40, 41 for their entire length, but only at or near the slots 59′, and for this purpose the frames are provided at these points with raised and internally-threaded portions or bosses into which the screws 59″ are fitted.

The standards 62, 66 serve as supports for machinery such as a moulder and a conveyer for feeding the balls or rolls of dough from the moulder to our conveying mechanism, but as these devices form no part of our present invention, they have not been illustrated in the drawings.

The point at which the moulded balls or rolls of dough are fed to the tins or pans 56 (which the conveyer A carries along the table 43 and its continuation formed by the bridging bars 44) from above, is located at the left of the standard 66 and has been indicated by the letter F (Figs. 6 and 8). It will be seen that this is beyond the left-hand edge 43″ of the table 43, and that at this point the bars 44 are spaced relatively far apart, so as to leave between them a relatively wide space or gap. Under this gap is arranged a trough 68, preferably open at one of its ends. This arrangement is provided in order to prevent the piling up of dough balls or rolls on the conveyer, in case there should be an interruption in the feeding of pans. Such dough lumps would then simply fall down through the gap between the bars 44 and drop into the trough 68 from where they may be removed through the open end without interfering with the continuous operation of our conveyer mechanism.

At a point near the sprocket wheels 49, the upper surface of the frames 40, 41 dips down to a level slightly below that of the pan-supporting bars 44 (Fig. 8), and from this point on each of the frames carries a pan-supporting plate 69, the upper surface of which is level with the bars 44 and table 43. The pan-guiding plates 59 are supported by short posts 70 forming upward extensions of the frames 40, 41, and as shown in Fig. 9, the plates 59 are also adjustable in and out on these posts, in the same manner as on the screws 59″. For convenience in manufacture and assembling, the guide plates 59 may be made of two or more pieces rigidly connected by plates 59ᶜ (Figs. 7 and 8).

The pan-supporting or bridging bars 44 are supported on one of the frame-spacing rods 42, and beyond this point of support they are bent toward each other so as to narrow the space between them (Fig. 7), and their left-hand ends are secured, as by screws 71, to the upright portions of two parallel horizontal members 72 which at that point are of L-shaped cross section. Between these upright portions travels a conveyer B comprising two parallel chains 73 connected at regular intervals by a set of pins 74, 74′ respectively, as shown in detail in Figs. 24, 26 and 27. On one of these pins, 74, is held pivotally, between the two chains, by means of a spring clip 75, a lug 75′ having a finger 75″ adapted to project at times above the chains and to engage the tins or pans 56 on the bars 44 and on the pan-supporting tables or plates 69. Each of the lugs 75′ is provided with another finger or projection 75ᵃ adapted to come in contact, from below, with the pin 74′ and thereby limit the upward movement of the lug. The downward movement of the lug is limited by contact of the finger 75″ with the said pin 74′.

The members 72 are supported at their right-hand end on a bracing member 76 secured to the frames 40, 41 (Figs. 7, 8 and 18) and at their other end on one of the spacing rods, 42ᵃ (see Figs. 13, 14 and 21), and for a portion of their length, as stated, they are L-shaped so as to form a channel 72′ which is open at the top for practically its while width (see Figs. 9, 18 and 19) while for the remainder of their length they are formed at the top with inwardly-extending flanges 72ᵃ leaving between them only a narrow opening or slot and forming the channel portion 72″ (see Figs. 20 and 21, also 9 and 24). These flanges serve as covers for the upper run of the conveyer chains 73, which latter are supported by relatively high tracks 77 and relatively low tracks 77′ located within the channels 72′, 72″ and separated by a gap 77″. Above this gap are provided short track portions 77ᵃ supported on the sides of the channel members 72; these track portions, however, do not support the chains from below, as do the tracks 77, 77′, but they engage the chains from above, as shown clearly in Fig. 24.

At a point to the right of the sprocket shaft 51 is located another shaft, 78, supported in the frames 40, 41 and carrying a double sprocket wheel 79 engaging the chains 73, these chains being engaged at the other end of their upper run by a double sprocket wheel 80 (Figs. 13 and 14) on a shaft 81 journaled in the frames 40, 41 and driven in the manner described below. From the sprocket wheel 80 the lower or return run of the chains passes down over two idlers 82 (Figs. 2, 12 and 20) and over tracks 83 in the bottom of the machine to a double sprocket 84 on a shaft 85, thence up around a sprocket 86 on a shaft 87 and from there to the sprockets 79 mentioned above. In order to always keep the conveyer chains 73 under proper tension, the shaft 85 is mounted in the frames 40, 41 adjustably (Figs. 8 and 16) by having its ends supported in slides 88 movable in guideways 40″, 41″ provided in the frames and extending lengthwise thereof. With the slides 88 are connected rigidly screw-threaded rods 88′ extending loosely through a part of the frame and having nuts 88″, tightening of which will move the rods 88′ and thereby the shaft 85 and sprockets 84 toward the right, thus insuring proper tightness of the conveyer chains 73.

As described above, the lugs 75′ are carried by the chains 73 pivotally, with the fingers 75″ projecting at times above the pan-supporting plates 69 so as to engage and feed the pans 56. In order to bring the lugs 75′, or rather their fingers 75″ into this pan-engaging position, we have arranged between the track 77, adjacent their right hand end, and secured thereto by means of screws 89″, a cam bar 89 having its right-hand end 89′ curved around the hub of the sprocket wheel 79 (Figs. 7, 8 and 17). This bar is located in the path of the lugs 75′ and by engaging the rounded portion 75$^a$ of the lugs (Fig. 26), it will compel the pan-engaging finger 75″ to project beyond the surface of the chains 73 and therefore above the pan supporting plates 69 when the chains begin their upper horizontal run. After they have firmly engaged the pans, the fingers 75′ will remain in contact therewith, even after the lugs have reached the end of the cam bar 89, the frictional resistance produced by the spring clips 75 preventing the lugs 75′ from changing their position with respect to the pans. The lugs 75′ will remain in their upper position until (after the set of pans engaged by them has been moved away as described below) the next set of pans advancing over the rounded surfaces 75$^b$ of the lugs 75′ press them down against the frictional resistance of the spring clips 75. The lugs 75′ will thus be brought to their lower position shown in Fig. 24, with the fingers 75″ clear of the path of the pans 56 and engaging the stop pins 74′ from above. To guard against the possibility of the fingers again projecting above the pan-supporting plates, and to insure their being brought to their lower position even after the last set of pans has been fed, we have provided the track portions 77$^a$, which engage the conveyer chains 73 from above (Figs. 24 and 25) and, acting in conjunction with the gap 77″, depress the chains and bring them to a lower level on which they continue their run in engagement with the relatively low tracks 72″.

The third conveyer, mentioned above, by means of which the pans are removed from engagement with the fingers 75″ of the second conveyer, comprises a carriage indicated as a whole by the reference letter C and adapted to reciprocate between the frames 40, 41, in a direction lengthwise of the machine (Figs. 12, 19, 20, and 28 to 33 inclusive). This carriage is formed by two parallel plates 90 suitably spaced from each other by spacing bars 91 and carrying flanged rollers 92 traveling on tracks 40$^a$, 41$^a$ formed on, or integral with, the frames 40, 41. To each of the carriage plates 90 are secured, at regular intervals, brackets 93 (four in the example shown); each of these brackets is fastened to the respective plate by screws 93′ extending through slots 93″ in the brackets, so as to permit of slight adjustment of the bracket lengthwise of the plate, and at its upper portions the bracket has a bearing for a short axle 94 with which is connected rigidly, on one side of said bearing, a lever 95 having an upwardly-projecting portion or finger 95′ and a downwardly-extending portion 95″ adapted to engage at times a portion 93$^a$ on the bracket 93 and thus form a stop for the lever motion (Figs. 21, 32 and 33). On the other side of the bearing, the axle 94 carries rigidly a downwardly-extending crank 96 (Fig. 33) connected at its lower end with a stud 96′ extending through a sleeve or collar 96″ having, adjacent to the lever 96, a flange 96$^a$ and at its other end a screw-thread 96$^b$ engaged by a nut 96$^c$ which secures said sleeve rigidly to a coupling member 97. This latter is formed with slots 97′ (Fig. 29), so as to permit of an adjustment of the sleeve 96″ lengthwise of the coupling member 97. The stud 96′ has in its outer end a screw-threaded socket into which fits a screw 96$^d$ the head of which holds the collar 96″ and nut 96$^c$ securely in place. It will be seen that this arrangement clamps the stud 96′ securely to the coupling 97, that is, it prevents longitudinal movement of one part with respect to the other, while allowing a pivotal movement between these two parts. The couplings 97 of each plate 91 are rigidly connected by rods 98; these rods extend beyond the two outermost couplings 97, and each of the rod extensions 98′ has at its end a pivotal engagement with a crank 99 on a shaft 99′ journaled in the plates 90, so that, when the shaft 99′ is rocked the rods 98 on both sides will move in unison (see Figs. 29 and 32). On one side of the carriage, the shafts 99′ carry rigidly other crank arms 99″ having at their free ends rollers 99$^a$ engaged at times by certain cams as will be described below. The extensions of the connecting rods 98 are formed with right and left-hand threads for the purpose of changing their effective length and thereby adjusting the position of the crank arms 99, 99″ and of the rollers 99$^a$.

The reciprocating movement of the carriage C is effected by the following mechanism: To the forward end of the carriage is secured, as by screws 100′, a bracket 100 having a vertically-extending guideway 100″ for a slide block 101′ arranged between, and carried by, two conveyer chains 101 engaged by sprocket wheels 102, 103 respectively (Figs. 9, 10, 12, 20, 21, 28 and 29). The upper and lower runs of these chains are supported by suitable stationary tracks 104. The sprocket wheels 103 are carried on shafts 103′ rotating in bearings 105 rigid with the frames 40, 41 (Fig. 21), while the sprocket wheels 102 are secured to shafts 102′ supported in bearings 106 movable in guideways 106′ of the frames 40, 41 (Figs. 9 and 10), these latter bearings being adjustable in the guideways 106′ by means of a screw-threaded rod 107 rigidly connected with a yoke 106'' (rigid with the bearings 106) and extending through a cross member or brace 42^b of the frames 40, 41 (Figs. 9, 10 and 19). Proper adjustment, for the purpose of keeping the chains 101 under the desired tension, is made by tightening or loosening the nuts 107' on the rod 107. It will be seen that with the connection above described, the chains 101 will carry the slide block 101' along and cause the carriage C to travel back and forth on the tracks 40^a, 41^a, the block moving down in the guideway 100'' during its travel around the sprockets 103 and up during its travel around the sprockets 102.

During the forward travel of the carriage, from right to left, the fingers 95' project above the pan-supporting plates 69, through slots formed between said plates and the channel members 72, and engage the pans supported on the plates 69, as shown in Figs. 10, 12, 20 and 28, while during the return travel (from left to right) the levers 95 are tilted so that the fingers 95' will not project above said plates (Fig. 31) and will thus clear the bottoms of the pans being brought along on said plates or tables by the conveyer B. At the right-hand end of the carriage's travel the upward tilting of the lever fingers 95' is effected (for all such fingers simultaneously) by a trip cam 108 (Figs. 8, 18, 34 and 35) engaging the roller 99^a at the right-hand or rear end of the carriage. The cam 108, which faces rearwardly, is mounted pivotally at 108' in a normally stationary bearing 109 having a dove-tail engagement with a stationary guide 109' on the frame 40. As shown in Figs. 18 and 34, the bearing 109 is made in two parts held together and clamped on the guide 109' by a screw 109'', this arrangement permitting of an adjustment of the trip cam 108 lengthwise of the frame 40. The bearing 109 furthermore has an inward projection or ledge 109^a into which is screwed a downwardly-extending rod 110 serving to hold one end of a coiled spring 110', the other end of this spring being secured to a forward extension or lug 108'' on the trip cam 108, which lug is held in contact with the ledge 109^a by the spring 110'. This lug serves as a stop to limit the swinging movement of the cam 108 in one direction (from right to left, or contra-clockwise).

At the other end of the carriage's path, at a point near the sprocket wheels 103, is arranged another trip cam, 111 (Figs. 11, 12 and 20), similar to the cam 108, but facing in the opposite direction, that is, forwardly. This cam 111 is mounted adjustably in a slot 112 of the bearing 105 on the frame 40 and has a rearward extension 111' engaging a ledge on the bearing 105 and a spring 113' secured to said extension and to a rod 113 and tending to hold said extension in contact with said ledge. In operation, with the carriage moving forward, from right to left (Fig. 28), the fingers 95' will project above the pan-supporting plates 69, as stated above, and feed the pans forward. When the roller 99^a at the forward end of the carriage strikes against the flat vertical face of the trip cam 111, this latter will yield by swinging on its fulcrum (the spring 113' allowing such movement) until it clears the path of the roller; after the roller has passed to the other side of the cam 111, the spring 113' restores the cam to its normal position, with the cam extension 111' engaging the ledge on the bearing 112 and preventing further movement of the cam in this direction. This position is indicated in full lines in Fig. 28. As soon as the carriage starts on its return movement (from left to right), the roller 99^a just mentioned will engage the inclined or cam surface of the cam 111 (which is now held rigid as just described and will ride up on this surface, causing the mechanism consisting of the rods 98, 98' and couplings 97 to move toward the right, thereby tilting the levers 95 so that the fingers 95' will no longer project above the plates 69 and will therefore not interfere with the pans that are being fed along by the conveyer B. At the other end of the carriage's travel the reverse movement takes place. The roller 99^a at the rear end of the carriage (at the right in the drawings) first causes the trip cam 108 to swing on its pivot until it is clear of the roller's path, whereupon the cam swings back to its normal position under the action of the spring 110' (position shown in Fig. 28 in dotted lines). As soon as the carriage starts on its forward movement, this roller 99^a will ride up on the cam surface of the cam 108 (which latter cannot yield in this direction), thus causing the rods 98, 98' and couplings 97 to move toward the left and thereby to project the fingers 95' into a position in which they will engage and feed the pans along on the pan-supporting plates 69.

As the carriage C stops after performing its forward movement (Figs. 20 and 28), it leaves the pans or sets of pans resting on the tables or plates 69 in a position from which they will be removed or pushed off sideways by means of a pushing mechanism which will be described presently. This pusher, which has been indicated in its entirety by the letter P, is supported in frames 114, 114' extending in a direction transverse of the frames 40, 41, adjacent the frame 40 (Figs. 11, 12 and 20). Between the frames 40, 41 is arranged, extending lengthwise of the machine, a shaft 115 on which is secured rigidly a pinion 116 in mesh with a gear 117 mounted loosely on a sleeve 118 carried by a cam shaft 119 supported in suitable bearings on the frames 114, 114'. Rigidly connected with said gear 117 is a pinion 120 in mesh with a gear 121 mounted rigidly on a counter shaft 122 also supported in the frames 114, 114' and carrying rigidly, adjacent to the frame 114', a pinion 123 in mesh with a gear 124 mounted rigidly on the cam shaft 119. The shaft 115, which is driven continuously as will be described below, will thus impart a continuous rotary movement to the cam shaft 119. On this cam shaft are mounted rigidly two cam disks 119' each of which is formed with a cam surface engaging a roller 125' at the lower end of a slide 125 movable in a vertically-extending guide 126 and having at its upper end a swivel connection with a sleeve 127 in which is adapted to slide, in a direction transverse to that of the conveyers, a rod 128. The two rods 128 are connected pivotally at their rear ends (away from the conveyer frames) with one end of levers 129 fulcrumed on the pusher frames at 129' and having intermediate their ends pivotal connections 130' with connecting rods or links 130, the other ends of which are pivotally connected at 119'' with the cam disks 119', at a distance from their centers; the cam disks therefore form cranks for the connecting rods 130, and during their rotation they cause the rods 128 to reciprocate transversely over the conveyer mechanism.

The forward ends of the rods 128 are connected by means of screws 131' to a pusher bar 131 extending parallel to the conveyer frames and adapted to engage, during the outward movement (toward the right in Fig. 20) of the rods 128, the pans or sets of pans which have been left on the plates or tables 69 by the carriage 90 and to push them onto a table, conveyer, or other supporting devices arranged in connection with a chamber, called the "final proofer" in which the dough is allowed to rise. The pusher bar 131, however, does not travel in a straight in-and-out path, but it follows the peculiar path indicated by the dotted line in Fig. 20; this is due to the connection of the rods 128 with the slides 125 and to the engagement of the latter by means of the rollers 125', with the cam surfaces on the disks 119'. These cam surfaces are formed by a cylindrical or concentric portion 119$^a$ and another concentric portion 119$^b$ of a smaller diameter than that of the cam portion 119$^a$ so that the cam surface 119$^b$ is nearer to the center of the cam disks than the cam portion 119$^a$; these two concentric portions are connected by falling and rising portions 119$^c$ and 119$^d$ respectively. It will be seen that with the position illustrated in Fig. 20, the rods 128 with the pusher bar 131 are just starting on their outward movement (toward the right in Fig. 20) and the rollers 125' are on the falling portion 119$^c$ of the cam surface. The pusher bar is therefore being brought to a lower position which it will reach soon after the beginning of the outward movement. After the rollers 125' have reached the inner cylindrical portion 119$^b$, they will remain in contact therewith for almost half a revolution of the cam disks, that is, the pusher bar 131 will travel in a practically straight path indicated by the lower horizontal dotted line in Fig. 20. When the bar 131 has reached the end of its outward stroke and starts on its return stroke, it will be lifted gradually owing to the rollers 125' traveling up the rising portion 119$^d$ of the cam surface, this portion of the bar's path being indicated by the inclined line at the beginning of the return stroke. As soon as the rollers 125' have reached the outer cylindrical portion 119$^a$ of the cam surface, the bar 131 will then continue its return stroke in a practically straight line or plane, as indicated by the upper horizontal dotted line. The pusher bar, after having performed its outward or working stroke, will therefore be lifted above the level of the pans and will thus clear the pans that are being brought along on the tables 69 by the carriage C. The pusher bar 131 is adjustable lengthwise of the bars 128, slots 131'' being provided for this purpose, these slots cooperating with the screws 131' to hold the bar in any adjusted position.

The various conveyers described above are driven in the following manner: On the shaft 115, which is supported in the bearing 42$^b$ and also in bearings 132, 132', 132'' extending between the frames 40, 41, is mounted rigidly a worm 133 in mesh with a worm wheel 134 on a transverse shaft 135 supported in the frames 40, 41 (Figs. 13 and 14). The shaft 135 carries a pinion in mesh with a gear 137 on the conveyor shaft 81 (thus driving the conveyer B), and the gear 137 is also in mesh with a pinion 138 on a transverse shaft 139 supported in the frames 40, 41 and carrying, on the outer side of these two frames, gears 140 in mesh with pinions 141 mounted rigidly on the short shafts 103' carrying the sprockets 103 of the carriage chains 101, see Figs. 11, 12 and 21, (thus driving the carriage chains 101 and thereby the carriage C). The conveyer A (formed by the chains 47) is driven from the conveyer B (formed by the chains 73) by means of a gear 142 (Figs. 7, 8 and 17) on the sprocket shaft 78 engaging a pinion 143 on an intermediate short shaft 144, this pinion being in mesh with a gear 145 on the shaft 51 carrying the sprockets 49 of the first conveyer.

The ratio of gearing of the various gears is such that the conveyer chains 47 and 73 (conveyers A and B) are driven at the same speed, while the carriage chains 101 are driven at a speed twice that of the other chains, so that the carriage C travels a certain distance twice (once forward and once backward) during the time in which the other conveyers travel the same distance once.

Arranged alongside the shaft 115 and also supported in the bearings $42^b$, 132, 132', 132", is another shaft, 146 (Figs. 9, 10 and 19), driven from an electric motor or the like (not shown) by means of a chain engaging a sprocket wheel 147 mounted on the shaft loosely and connected by a weakened pin 148 with a sleeve 149 rigidly secured to the shaft 146. A safety connection is thus provided, the pin 148 being strong enough to transmit the power required for normal operation of the machine; if, however, unusual resistance is encountered, say by the breaking of some part or by some part of the apparatus getting out of order, the pin will no longer be strong enough to overcome this increased resistance and will break, allowing the sprocket to continue its rotation without transmitting such rotation to the shaft 146, and thus permitting this shaft and thereby the whole machine to come to a stop.

As the shaft 146 normally rotates at a constant speed and as it may be desirable to vary this normal speed, as will be explained below, we have provided a change-speed gearing for transmitting motion from one shaft to the other. This gearing consists in the particular case illustrated of three sets of gears 151—151', 152—152', and 153—153', of different sizes, so that three different speeds can be given to the shaft 115 (Figs. 13, 14, 22 and 23). It will be seen from Fig. 23 that the gear 152 on the shaft 146 has the smallest diameter; the gear 151 is somewhat larger, and the gear 153 still larger, and inversely, the gear 152' on the shaft 115 is the largest, the gear 151' is somewhat smaller, and the gear 153 the smallest. The gears of each set are of such a size that when brought into proper alignment, they will mesh properly and transmit power from one shaft to the other.

With the gears 151, 151' in mesh, as shown in the drawings, the shaft 115 will rotate with its middle speed, while if the gears 152, 152' were in mesh, it would rotate at a slower speed, and if the gears 153, 153' were in mesh, it would rotate at a faster speed.

In order to be able to shift the gears, so as to change the speed of the shaft 115 as may be desired, we have mounted the gears 151', 152', 153' rigidly on a sleeve 154 held on the shaft 115 slidably by means of keys 115'. The sleeve 154 is also provided with a groove 154' engaged by a shoe 155' secured to, or forming part of, a slide 155 adapted to move lengthwise on a guide bar 156 secured to the frame 40 as by screws 156', but suitably spaced therefrom (Fig. 22). The change gear slide 155 is provided with rack teeth 155" engaged by a pinion 157 at the lower end of a vertical shaft 158 supported in a bearing bracket 159 arranged between the frames 40, 41. At its upper end, which projects above the machine frames, the shaft 158 carries a hand wheel 160 by means of which the shaft can be turned, thereby moving the slide 155 lengthwise on the guide bar 156. This movement will cause the sleeve 154 to also move lengthwise on the shaft 115, so as to bring one of the gears 151', 152' or 153' into mesh with its companion gear 151, 152 or 153. For the purpose of locking the shaft in any of its adjusted positions, and to prevent the gears from getting out of mesh accidentally, the shaft is provided with a disk 161 having in its periphery three recesses 161' adapted to be engaged by a lug or projection 162' on a locking lever 162 fulcrumed at 159" on an upward extension 159' of the bearing bracket 159 (Figs. 13, 14 and 36). Each of the recesses 161' corresponds to the meshing position of one of the sets of gears 151—151', 152—152' or 153—153'. As it may be desirable to lock the shaft 158 in a neutral position, that is, in a position in which all of the gears 151', 152', and 153' are disengaged from their companion gears, we have provided, between adjacent recesses 161', other recesses, 161", by means of which the shaft may be locked in such neutral position. Between the two adjacent recesses 161' which correspond to the two extreme positions of the gear sleeve 154, the disk 161 is provided with an outward projection $161^a$ which, by coming in contact with the lug 162', will stop any further movement of the disk 161 beyond its positions corresponding to the extreme positions of the gear sleeve 154.

To unlock the disk 161 for the purpose of adjustment of the gear sleeve 154, the locking lever 162 is swung downward on its fulcrum until the lug 162' clears the recess 161' with which it was in engagement. For the purpose of limiting this swinging movement, the lever is provided, on its side opposite to that of the lug 162', with a projection 162" (Fig. 36) adapted to engage a stationary stop $159^a$ on the bearing 159'. Before unlocking the disk 161, as just described, the conveyer mechanism will in most cases have been stopped by the operator, say by shutting off the current from the electric motor driving the mechanism. However, to make absolutely sure that no adjustment of the gears can be attempted while the machine is still in operation, we have combined with the locking lever 162 a safety device by means of which the power will be turned off from the motor as soon as the locking lever is moved to its unlocking position. For this purpose the lever 162 is provided on its side opposite the handle, with a lug or projection 162ª being perforated to receive a contact pin 163 surrounded by a sleeve 163' made of fibre or other insulating material, so as to insulate the pin from the lever 162 (Figs. 36 and 37). In the locking position of the lever, the pin 163 engages with its projecting ends the inner faces of contact strips or plates 164 secured, by means of screws 165', to two opposite sides of an insulating block 165 made of fibre or the like and attached to the bearing 159' by means of a screw 165". The screws 165' extend preferably through slots in the contact plates 164, so as to permit of an adjustment of the plates up or down. One of the contact plates 164 is connected in any suitable manner (not shown) with a wire leading to the motor driving the conveyer mechanism, while the other plate is connected with the source of current (say, a dynamo, not shown) supplying the power to the motor. The pin 163 is so arranged that with the lever 162 in the gear-locking position, it will be located between the contact plates 164, thus closing the circuit from the supply source to the motor; as soon, however, as the lever is swung on its fulcrum so as to unlock the disk 161, the pin 163 will move up, out of contact with the two plates 164, and thus interrupt the motor circuit, whereupon the conveyer mechanism will come to a stop, before any adjustment of the gears can be made. As will appear clearly from the drawings, the pin 163, in the locking position of the lever 162, is wedged tightly between the two contact plates and the lever 162 is thus held securely in the locking position until it is swung out of such position by the hand of the attendant. The lever will then remain in this unlocking position, with the projection 162" in engagement with the stop 159ª, until it is swung back to the locking position by the hand of the attendant.

In changing from one speed to another, it may happen that the gears will not mesh properly, that is, the teeth of one gear may strike against the teeth of its companion gear instead of entering the tooth spaces. In order to facilitate the proper meshing, we have provided means (illustrated in Figs. 13, 14 and 22) whereby one of the shafts, the shaft 146, can be given a turning movement about its axis, so as to bring the gears on this shaft into meshing position with the corresponding gears on the shaft 115. Through an opening 166' in the top cover 106 extends a lever 167 fulcrumed on the shaft 146 at 167' and normally pulled forward, against a bumper spring 168, by a coiled spring 169 attached to the lever and to the frame 40. Near the upper end of the lever 167 is secured pivotally at 167" a gripping lever 170 extending beyond the pivot 167" and formed with a crank 170' the outer end of which is pivotally connected with a rod 171 extending in the direction of the lever 167 and adapted to slide lengthwise thereof in a guide 167ª formed thereon. The extent of the longitudinal movement of the rod 171 in both directions is limited by a pin 172 screwed into the rod 171 and cooperating with a slot 167ᵇ provided in the guide 167ª. At its lower end the rod 171 is provided with a projection or tooth 171' adapted to fit between the teeth of a pinion or ratchet 173 mounted rigidly on the shaft 146. A coiled spring 174 interposed between the guide 167ª and a collar 171" on the rod 171 normally holds the rod 171 in its upper position and thus keeps the tooth 171' out of engagement with the teeth of the ratchet 173. The length of the rod 171 may be adjusted by means of an adjusting sleeve 171ª. It will be seen that moving the gripping lever 170 against the lever 167 will project the tooth on the rod 171 downward, into engagement with the teeth of the ratchet 173, whereupon a swinging movement of the lever 167 will cause the shaft 146 to turn about its axis. By swinging the lever 167 back and forth, the attendant will be able to bring the teeth of one gear into alignment with the tooth spaces of the mating gear.

The operation of our conveyer mechanism is as follows:

The pans 56, several of which are preferably connected by means of connecting bars, as shown in Figs. 10 and 28, to form a set of a length corresponding to the distance between successive pins 47' of a conveyer chain 47, are placed on the right-hand or receiving end of the table 43 by hand or in any other convenient manner in such a way that the last pan of the set will be engaged from behind by two correspondingly-located pins on the two conveyer chains 47. The chains 47, the upper run of which travels continuously in the direction from right to left, will feed the pans along on the table 43 and push them, at the left-hand end of said table onto the spaced bridging members or bars 44 forming a continuation of said table. At the point F (Figs. 6 and 8) a ball or roll of dough D is dropped into each pan from above as it passes under this point. The feeding of the dough portions at this point may be effected by means of a suitable conveyer which receives said dough portions from a "moulder" of a character well-known in the art. The conveyer which feeds at this point F may be for instance of the construction shown in our co-pending application Serial No. 411,749, filed September 21, 1920. Should there be any interruption in the supply of pans, before it has been possible to stop the mechanism feeding the dough balls or rolls, such lumps of dough will drop down between the spaced bridging members 44 into the trough 68 from which they may be removed in any convenient manner.

After the pans have passed the dough-feeding point, they are engaged from below by the fingers 75" carried by the second conveyer B, (formed by the chains 73), each finger 75" being projected upwardly by engagement of the lugs 75' with the cam bar 89. The lugs 75' are spaced the same distance apart as the successive pins 47' on the conveyer chains 47 and they are so located with respect to the pins 47' that they will engage the same pans that are engaged by said pins, that is, the rear or last pan of each set of pans. Immediately thereafter, the pins 47' will be disengaged from the pans by passing down to the lower or return run of the conveyer chains 47, and the pans are then fed along on the pan-supporting plates 69 by the fingers 75", the second conveyer traveling at the same speed as the first conveyer.

In the particular embodiment illustrated, our conveyer-and-pusher mechanism is so arranged that four sets of pans (the pans of each set being preferably connected, as above described) together form a unit which is removed from the machine by one operation of the pusher. As soon, therefore, as four such sets of pans have been fed onto the plates or tables 69, the carriage 90 will start on its forward movement, from right to left, this movement projecting the carriage fingers 95' upward into a position in which they will engage the sets of pans from behind and remove them from engagement with the fingers 75", the carriage traveling at a greater speed (approximately double) than the conveyer chains 73. The unit of pans (consisting of four sets as above described) will thus be fed forward by the carriage 90 until they reach a position in front of the pusher rod 131. The slide block 101' carried by the chains 101 will then have reached its forward position, adjacent to the sprockets 103, and by traveling around these sprockets, it will arrest the forward motion of the carriage and immediately start the latter on its return travel. The beginning of this movement will withdraw the fingers 95' from engagement with the pans and will swing them to a position in which they will no longer project above the pan-supporting plates 69; in this position they will now travel back with the carriage to the position first described, and as soon as the carriage starts again on its forward or active movement, the fingers 95' will again be projected upward, into engagement with a new unit of pans which has been brought along by the conveyer B, as described above.

In the meantime the first pan unit, which has been left on the plates 69 by the carriage 90, will be pushed off sideways in the manner described above, onto a conveyer or other support S (Fig. 20), to reach a chamber or apparatus (not shown) called the "final proofer." At the end of its outward or active stroke the pusher bar will be lifted and perform its return stroke in such raised position, so as to clear the new set or unit of pans which is being brought along on the tables or plates 69 by the carriage 90.

In practice it may be desirable to change the size of the loaves of bread to be baked, and therefore also the size of the balls or rolls of dough to be conveyed by our conveying mechanism. This will necessitate the changing of the pans for the reason that smaller loaves will also have to be baked in smaller pans. Inasmuch as the length of one set of pans is defined by the distance between succeeding pins or fingers on the conveyer and carriage chains, smaller pans might simply be spaced apart so that they would take up the same space as larger pans. This, however, would be a waste of space on the conveyer and in the final proofer, and in order to utilize the full capacity of this machinery, we have devised the change-speed gearing described above. It is to be understood that the balls or rolls of dough are delivered to the conveyer mechanism at a constant rate of speed and at regular intervals (for instance at the rate of 96 lumps of dough per minute). Now, it is evident that by changing the rate of speed at which the conveyer 47 travels, we move the points at which the lumps of dough fall into the pans, closer together or farther apart. If the speed is increased, the lumps will fall farther apart; if it is reduced, they will fall closer together. Consequently, the largest pans, the centers of which are the farthest apart, will have to be moved at the greatest speed, while the smallest pans with their centers closer together, will have to be moved at the smallest rate of speed. With the specific embodiment of our arrangement described above, we are enabled to use pans of three different sizes; with the largest size, there will be four pans per set or sixteen per unit; with the next smaller size, five per set or twenty per unit, and with the smallest size, six per set or twenty-four per unit.

It will be seen from the drawings that with the gears 152, 152' in mesh, the shaft 115 and therefore the whole conveyer mechanism will be driven at its middle speed. In this case each set consists of five pans and each unit of twenty pans, and these will pass under the feeding point F at such a rate of speed that five balls or rolls of dough will be delivered to each set of pans. With the other speeds of the mechanism, each set of pans will consist of four or six pans respectively, and a corresponding number of dough balls or rolls will be delivered to each set.

If it is desired to change the speed of the conveyer mechanism, for the purpose just described, the operator or attendant will first unlock the locking lever 162 from the disk 161, thereby shutting off the power from the motor driving the conveyer mechanism (if this has not been done already). Then he will grasp the handwheel 160 and turn the latter until the notch or recess 161′ corresponding to the speed it is desired to give the mechanism comes into proper position with respect to the locking lever 162, thus indicating that the respective gears are in mesh, whereupon he again locks the disk 161 by swing the lever 162 to its locking position, as described above. The mechanism may then again be started, the contact pin 163 having closed the circuit to the motor by the swinging of the locking lever to the locking position. If it should not be possible to mesh the gears at once, that is, if the teeth of one of the gears should abut against the teeth of the other gear instead of entering the tooth spaces, the operator will grasp with one hand the lever 167 and by moving it slightly and at the same time pressing the gripping lever 170 against the lever 167, he will project the tooth 171′ at the lower end of the rod 171 into engagement with the teeth of the ratchet wheel 173. By then moving the lever 167 back and forth and at the same time trying to give a further turn to the handwheel 160, he will be able to bring the teeth of the gears into meshing engagement and to then properly lock them in such meshing position.

It is to be understood that the speed of all three conveyers and of the pusher will be changed at the same time, so that the proper relation of speed will always be maintained between the various parts of the mechanism. The gearing of the various parts is such that the two conveyers A and B are always driven at the same speed, while the carriage C travels at approximately twice the speed of the conveyers A and B. The pusher will always perform its active or operating stroke immediately after the pans have been deposited before the pusher bar by the carriage C.

We claim:

1. Conveying mechanism comprising a conveyer composed of longitudinally-movable spaced members parallel to the direction of movement, another conveyer extending in advance of said members and narrower than the first-named conveyer, both conveyers being movable in the same direction at the same speed, and a carriage movable adjacent to a portion of the second conveyer in the same direction but at a greater speed than said conveyer, and having means to remove from contact with the second conveyer a portion of the articles fed by the said conveyer.

2. Conveying mechanism comprising a conveyer composed of two lateral parallel members, another conveyer located centrally and extending in advance of the first-named conveyer, both conveyers being movable in the same direction at the same speed, and a carriage movable adjacent to a portion of the second conveyer in the same direction but at a greater speed than said conveyer, and having means to remove from contact with the second conveyer, a portion of the articles fed by the said conveyer.

3. Conveying mechanism comprising two conveyers arranged in tandem fashion and one of them comprising two parallel members between which a portion of the other conveyer extends so that the conveyers overlap, and a carriage movable adjacent to a portion of the second conveyer in the same direction but at a greater speed than said conveyer, and having means to remove from contact with the second conveyer, a portion of the articles fed by said conveyer.

4. Conveying mechanism comprising a longitudinally moving conveyer, a carriage movable adjacent to a portion of said conveyer and in the same direction, and having means to remove from contact with said conveyer, a portion of the articles fed by said conveyer, and means for imparting motion to said carriage at twice the speed of said conveyer.

5. Conveying mechanism comprising two conveyers arranged in tandem fashion and one of them comprising two parallel members between which a portion of the other conveyer extends so that the conveyers overlap, and a carriage movable adjacent to a different portion of said other conveyer and having means to remove from contact with the second conveyer, a portion of the articles fed by such conveyer.

6. Conveying mechanism comprising two conveyers arranged in tandem fashion and one of them comprising two parallel members between which a portion of the other conveyer extends so that the conveyers overlap, and a carriage movable adjacent to a different portion of said other conveyer and having means arranged to travel on opposite sides of such conveyer and to separate a portion of the articles fed by such conveyer.

7. Conveying mechanism comprising a longitudinally moving conveyer, and a carriage movable adjacent to said conveyer, and having means arranged to travel on opposite sides of such conveyer and to separate a portion of the articles fed by such conveyer.

8. Conveying mechanism comprising a longitudinally reciprocating carriage having feeding members movable in parallel paths to engage the articles to be conveyed, and a conveyer having article-engaging means arranged to travel between said parallel paths.

9. Conveying mechanism comprising transversely-spaced feeding members movable in parallel longitudinal paths to engage the articles to be conveyed, and a longitudinally moving conveyer having article-engaging means arranged to travel between said parallel paths.

10. Conveying mechanism comprising a longitudinally moving conveyer having means to engage the central portions of the articles to be conveyed, a carriage arranged to reciprocate adjacent to said conveyer, feeding members arranged to travel in parallel paths on opposite sides of said article-engaging means and mounted on said carriage movably and means whereby said feeding members will be moved relatively to the carriage and projected into operative position during the forward movement of the carriage and withdrawn to an inactive position during the return movement of the carriage.

11. Conveying mechanism comprising a longitudinally moving conveyer having means to engage the central portions of the articles to be conveyed, a carriage arranged to reciprocate adjacent to said conveyer, feeding members carried by said conveyer and arranged to travel in parallel paths on opposite sides of said central article-engaging means so as to engage the lateral portions of the articles, and means whereby said feeding members will be brought to an operative position during the forward movement of the carriage and to an inactive position during the return movement of the carriage.

12. Conveying mechanism comprising a longitudinal conveyer, a carriage arranged to recipricate lengthwise of said conveyer, feeding members mounted movably on said carriage and arranged to engage the articles and move them relatively to said conveyer, and means whereby said feeding members will be moved relatively to the carriage and brought into operative position during the forward movement of the carriage, and to an inactive position during the return movement of the carriage.

13. Conveying mechanism comprising a longitudinal conveyer, a carriage arranged to reciprocate lengthwise of said conveyer, feeding members pivoted to said carriage and arranged to engage the articles and move them relatively to said conveyer, and means whereby said feeding members will be swung relatively to the carriage to assume an operative position during the forward movement of the carriage and an inactive position during the return movement of the carriage.

14. Conveying mechanism comprising a longitudinal conveyer, a carriage arranged to move lengthwise of said conveyer and having means to move articles relatively to said conveyer, and a pusher movable transversely of the conveyer and of the carriage.

15. Conveying mechanism comprising a longitudinal conveyer, a carriage arranged to reciprocate along said conveyer and to move articles relatively thereto, and a pusher movable transversely in line with the position taken by the carriage at the end of its forward movement.

16. Conveying mechanism comprising a longitudinal conveyer, a carriage arranged to reciprocate along said conveyer and to move articles relatively thereto, and a pusher, of a width approximately equal to the length of said carriage, movable transversely in line with the forward position of the carriage.

17. Conveying mechanism comprising a longitudinal conveyer having article-engaging devices connected movably with said conveyer, means located adjacent to a portion of the conveyer path, for projecting said devices into their operative position while leaving them free to be retracted to an inactive position, at another portion of the conveyer path, and means operating along such other portion, for feeding the articles faster than the speed of the said conveyer.

18. Conveying mechanism comprising a longitudinal conveyer having article-engaging devices connected movably with said conveyer, means located adjacent to a portion of the conveyer path, for projecting said devices into their operative position while leaving them free to be retracted to an inactive position, at another portion of the conveyer path, and a reciprocating carriage movable along such other portion and having article-engaging devices which are in projected or operative position during the forward movement of the carriage and in retracted or inactive position during the return movement of the carriage.

19. Conveying mechanism comprising a longitudinal conveyer having article-engaging devices pivoted thereto to swing up or down, means located adjacent to a portion of the conveyer path, for swinging said devices up into their operative position while leaving them free to swing down to an inactive position, at another portion of the conveyer path, and means operating along such other portion, for feeding the articles faster than the speed of said conveyer.

20. Conveying mechanism comprising a table for supporting the articles to be fed, and lateral parallel endless conveyers having their upper and lower runs above and below the level of the table respectively and provided with aligning transverse pins projecting toward each other and adapted to engage the articles on said table.

21. Conveying mechanism comprising a table for supporting the articles to be fed, conveyer tracks adjacent to the longitudinal sides of said table, endless conveyers having upper runs resting on said tracks, and aligning pins projecting inwardly from said conveyers and adapted to engage the articles on said table.

22. Conveying mechanism comprising a table adapted to support the articles to be fed and having transversely-aligning cutout portions at its longitudinal edges, parallel endless conveyers located adjacent to said edges and having the portions which connect the upper and lower runs, in registry, with said cut-out portions of the table, and transversely-aligning pins projecting inwardly from said conveyers and adapted to pass through said cut-out portions and to engage the articles on said table.

23. Conveying mechanism comprising a table for supporting the articles to be fed, tracks adjacent to the longitudinal edges of said table, traveling conveyers resting on said tracks and having projections to engage the articles on said table, and cover plates located above the conveyer portions resting on said tracks.

24. Conveying mechanism comprising a table for supporting the articles to be fed, tracks adjacent to the longitudinal edges of said table, conveyers arranged to travel on said tracks and having means for engaging the articles on said table, cover plates extending above the conveyer portions which rest on said tracks, and lateral guides for said articles, extending above said cover plates, at each side of the table, at the inner edges of the cover plates.

25. Conveying mechanism comprising means for feeding articles in a predetermined path, guides located at each side of said path to engage said articles laterally, longitudinal racks on said guides, a transverse shaft journaled to turn about a stationary axis and having teeth in mesh with said racks, means for turning said shaft, and oblique guiding devices by the action of which the longitudinal motion imparted to the racks and guides by the rotation of said shaft will cause said guides to move toward or from each other.

26. Conveying mechanism comprising means for feeding articles in a predetermined path, a guide located laterally of said path to engage said articles, and provided with a rack extending lengthwise of said path, a transverse shaft mounted to turn about a stationary axis and having teeth in mesh with said rack, means for turning said shaft, and an oblique guiding device by the action of which the longitudinal motion imparted to the rack and guide by the rotation of said shaft will cause said guide to be moved transversely.

27. Conveying mechanism comprising a table for supporting receptacles to be fed, laterally-spaced longitudinal bars extending from the forward end of said table, means for feeding the receptacles along said table and bars, means for feeding articles to said receptacles from a point above said bars, and a support located beneath said bars at said feeding point to catch any articles which may drop through between said bars.

28. Conveying mechanism comprising a support for the articles to be fed, a carriage reciprocating lengthwise of said support and having a guideway transverse thereto, an endless traveling member having two runs parallel to the path of the carriage and a projection in sliding engagement with said guideway, to operate said carriage, a feeding device mounted on said carriage, and means whereby said device will be carried to assume an active position during the forward movement of the carriage, and an inactive position during its return movement.

29. Conveying mechanism comprising a support for the articles to be fed, a carriage movable lengthwise of said support, an endless traveling member having two oppositely moving runs parallel to the path of the carriage and also having a projection in driving engagement with said carriage to reciprocate it lengthwise of said support, a feeding device mounted on said carriage, and means whereby said device will be caused to assume an active position relatively to articles on said support, during the forward movement of said carriage, and an inactive position during its return movement.

30. Conveying mechanism comprising a support for the articles to be fed, a carriage movable lengthwise of said support, means for imparting a reciprocating motion to said carriage, a feeding device mounted on said carriage and movable relatively thereto, and means whereby said device will be caused to assume a projected or active position during the forward movement of the carriage and a retracted or inactive position during its return movement.

31. Conveying mechanism comprising a support for the articles to be fed, a carriage movable lengthwise of said support, means for imparting a reciprocating motion to said carriage, a feeding device mounted on said carriage and movable relatively thereto into a projected or active position and into a retracted or inactive position, and means, located at the ends of the carriage path to change said device from its active to its inactive position and vice versa.

32. Conveying mechanism comprising a support for the articles to be fed, a carriage movable lengthwise of said support, means for imparting a reciprocating motion to said carriage, a feeding device mounted on said carriage and movable relatively thereto into a projected or active position and into a retracted or inactive position, and cams located at the ends of the carriage path and arranged for cooperation with said device to change the position of said device at the points where the carriage movement is reversed.

33. Conveying mechanism comprising a support for the articles to be fed, a carriage movable lengthwise of said support, means for imparting a reciprocating motion to said carriage, a feeding device mounted on said carriage and movable relatively thereto into a projected or active position and into a retracted or inactive position, and spring-pressed cams located at the ends of the carriage path and mounted to swing about stationary axes transverse to the said path and arranged for cooperation with said feeding device to change its position at the points where the carriage movement is reversed.

34. Conveying mechanism comprising a support for the articles to be fed, a carriage arranged to reciprocate lengthwise of said support, a plurality of feeding devices mounted on said carriage and movable relatively thereto into a projected or active position and into a retracted or inactive position, connections whereby said devices are compelled to move in unison relatively to the carriage, and means, operated by the reciprocation of the carriage, for throwing said devices from one position to the other each time the carriage movement is reversed.

35. Conveying mechanism comprising a support for the articles to be fed, a carriage arranged to reciprocate lengthwise of said support, a plurality of feeding devices mounted on said carriage in tandem fashion and movable relatively thereto into a projected or active position and into a retracted or inactive position, connections extending lengthwise of the carriage path from one of said feeding devices to the others, to compel all of said devices to move in unison, and means, operated by the reciprocation of the carriage, for throwing said devices from one position to the other each time the carriage movement is reversed.

36. Conveying mechanism comprising a support for the articles to be fed, a carriage arranged to reciprocate lengthwise of said support, feeding devices pivoted to said carriage about horizontal axes, one in advance of another, and adapted to swing into either an active or an inactive position, longitudinal rods connecting said pivoted devices and compelling them to move in unison, and means, operated by the reciprocation of the carriage, for throwing said devices from one position to the other each time the carriage movement is reversed.

37. Conveying mechanism comprising a support for the articles to be fed, said support having a central longitudinal slot and two lateral longitudinal slots, a carriage arranged to reciprocate lengthwise of said support and provided with a feeding device adapted to project through said lateral slots to engage the articles on the support, means, operated by the reciprocation of the carriage, for causing said feed device to assume a projected position during the forward movement of the carriage and a retracted position during its return movement, a conveyer movable lengthwise of said support and having a feeding member adapted to project through the central slot of the support, and means for causing said feeding member to be retracted so as to allow the carriage to take over the feeding of the articles.

38. Conveying mechanism comprising a support for the articles to be fed, said support having a central longitudinal slot and two lateral longitudinal slots, a carriage arranged to reciprocate lengthwise of said support and provided with a feeding device adapted to project through said lateral slots to engage the articles on the support, means, operated by the reciprocation of the carriage, for causing said feed device to assume a projected position during the forward movement of the carriage and a retracted position during its return movement, a conveyer movable lengthwise of said support toward the path of said carriage and partly adjacent to said path, and having a feeding member adapted to project through the central slot of the support, and means for deflecting said conveyer adjacent to the path of the carriage to carry the said feeding member bodily from its projected position.

39. Conveying mechanism comprising a longitudinal conveyer, a pusher arranged to reciprocate transversely of said conveyer, and cam mechanism for causing said pusher to move adjacent to the conveyer during the forward stroke of the pusher and farther away from the conveyer during the return stroke.

40. Conveying mechanism comprising a longitudinal conveyer, a lever arranged to rock transversely of the conveyer, a rod connected with said lever and adapted to reciprocate across the conveyer as said lever is rocked, a sleeve in which said rod is adapted to slide, a pusher carried by said rod, and means for moving said sleeve up and down to carry the pusher toward and from the conveyer between successive strokes.

41. Conveying mechanism comprising a longitudinal conveyer, a lever arranged to rock transversely of the conveyer, a rod connected with said lever and adapted to reciprocate across the conveyer as said lever is rocked, a guide along which said rod is adapted to slide, a pusher carried by said rod, a slide movable up and down and having a swivel connection with said guide, and means for raising and lowering said slide to cause the pusher to travel adjacent to the conveyer during one stroke and farther away from the conveyer during the next stroke.

In testimony whereof we have signed this specification.

ROBERT ELMER BAKER.
LAURENCE SEYMOUR HARBER.